United States Patent
George et al.

(10) Patent No.: US 6,720,393 B1
(45) Date of Patent: Apr. 13, 2004

(54) MELT FLOW INDEX DETERMINATION IN POLYMER PROCESS CONTROL

(75) Inventors: Alan George, Rugby (GB); Peter Harper, Yowie Bay (AU)

(73) Assignee: Porpoise Viscometers Limited, Skelmersdale (GB)

( * ) Notice: Subject to any disclaimer, the term of this patent is extended or adjusted under 35 U.S.C. 154(b) by 0 days.

(21) Appl. No.: 09/622,558

(22) PCT Filed: Oct. 5, 1998

(86) PCT No.: PCT/GB98/02977

§ 371 (c)(1),
(2), (4) Date: Oct. 3, 2000

(87) PCT Pub. No.: WO99/43716

PCT Pub. Date: Sep. 2, 1999

(30) Foreign Application Priority Data

Feb. 25, 1998 (GB) ................................ 9803894

(51) Int. Cl.$^7$ .................................................. C08F 2/01
(52) U.S. Cl. ........................... 526/64; 526/65; 422/109; 422/110; 422/132; 422/135; 422/138
(58) Field of Search .............................. 526/64, 65, 89; 422/109, 110, 132, 135, 138

(56) References Cited

FOREIGN PATENT DOCUMENTS

EP  0 027 474 A1 * 4/1981

* cited by examiner

*Primary Examiner*—Robert Deshon Harlan
(74) *Attorney, Agent, or Firm*—Dorsey & Whitney LLP

(57) ABSTRACT

Closed-loop feedback control of (continuous) catalytic polymerisation, by regulating the introduction of a Chain Transfer Agent (CTA) to a reactor, and so polymer chain length formation; through responsive (on-line) MFI determination, of a reactor polymer sample, using an MFI measurement viscometer (70) with dual measurement dies (91, 93), for extended measurement range.

26 Claims, 17 Drawing Sheets

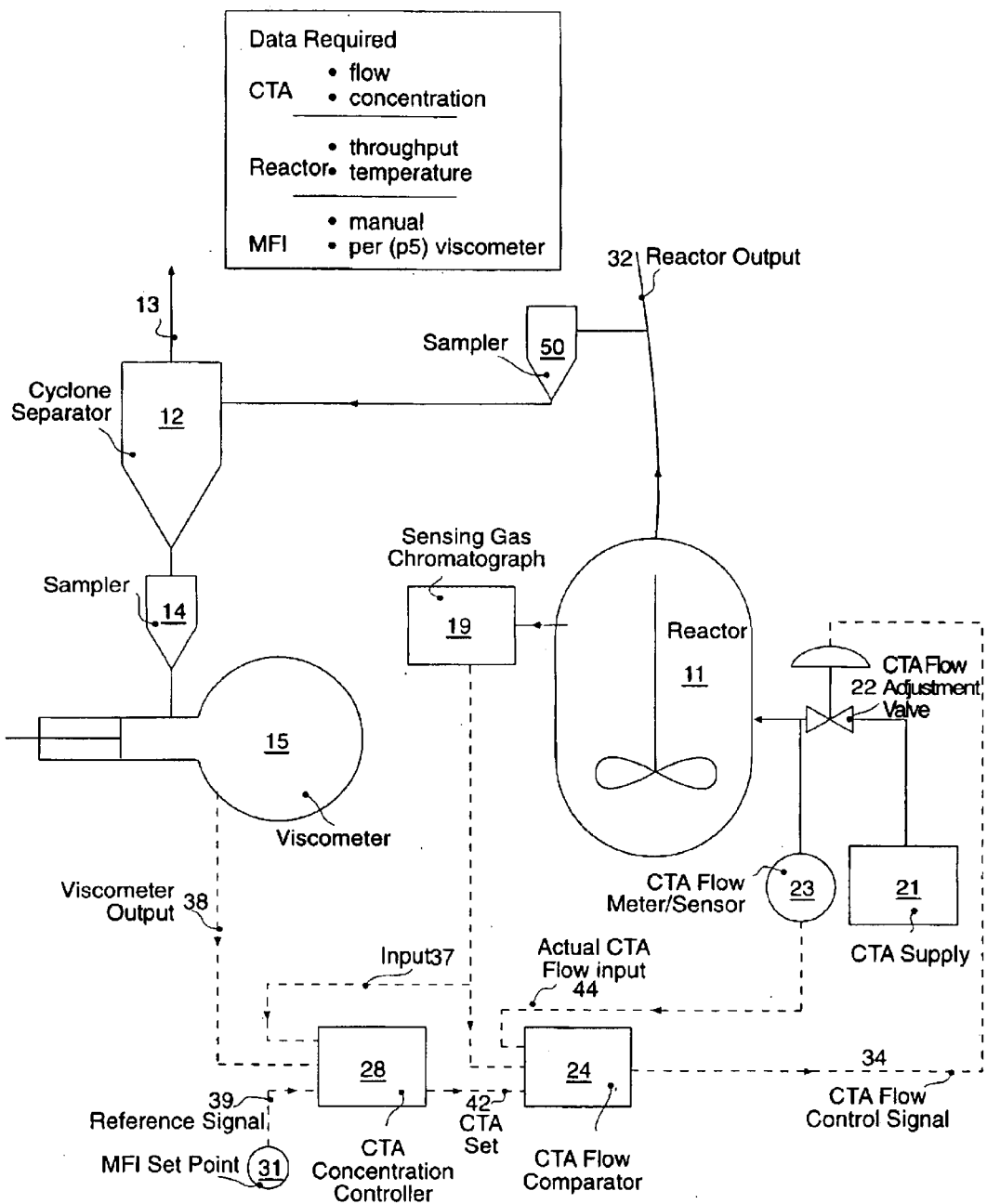
Figur 1B

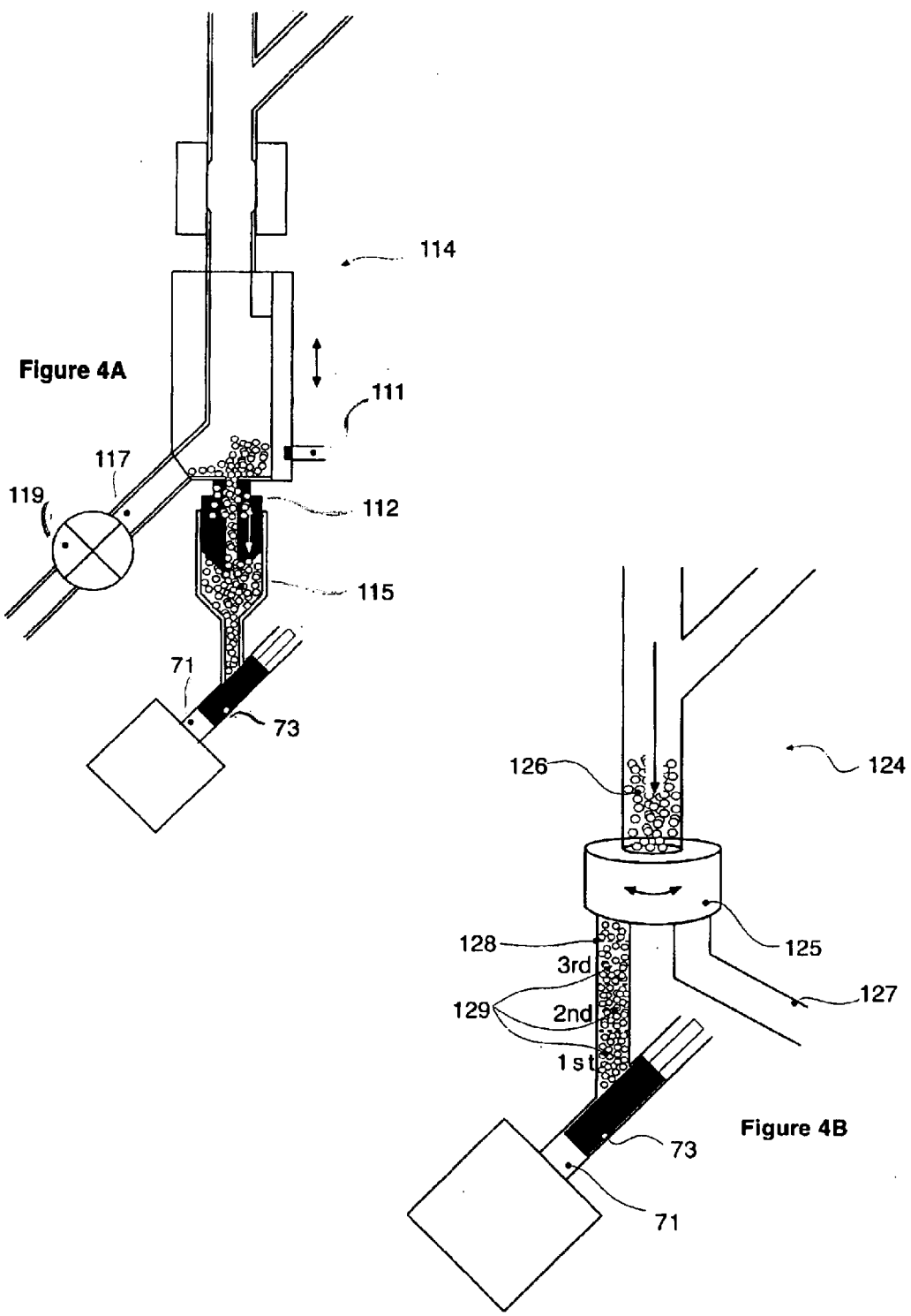

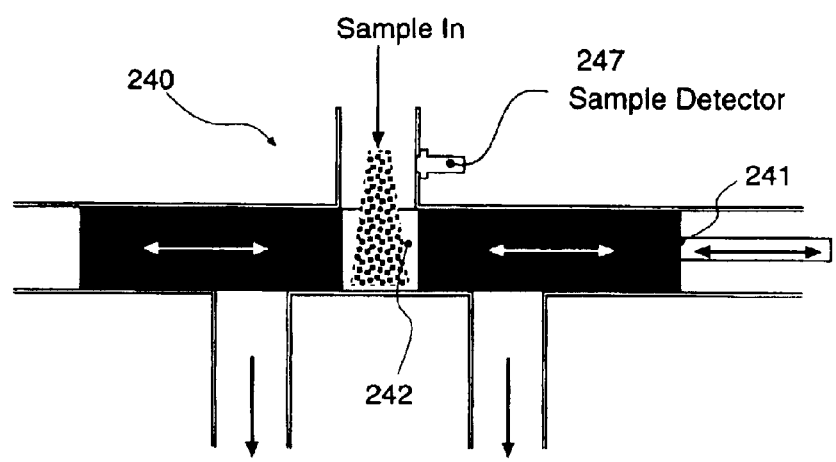
Figure 4C1
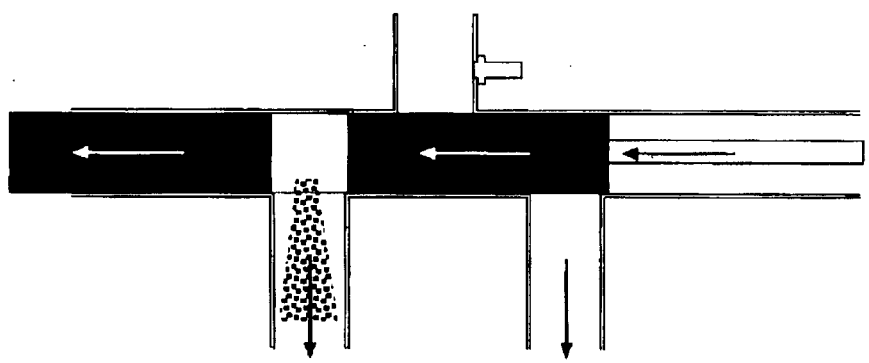
Figure 4C2
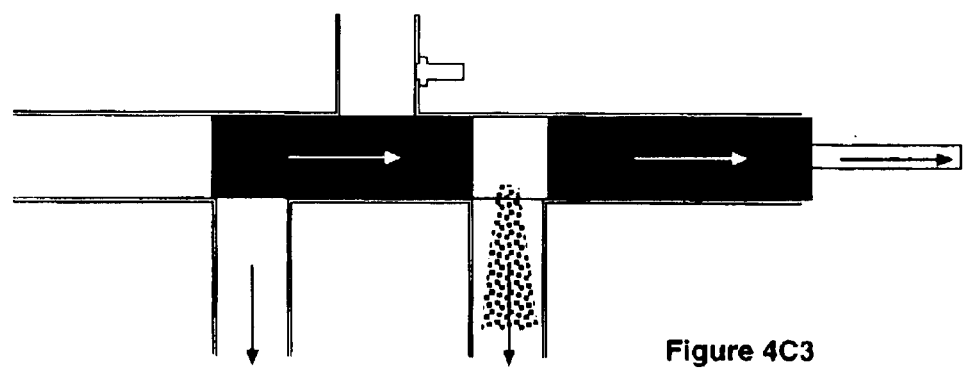
Figure 4C3

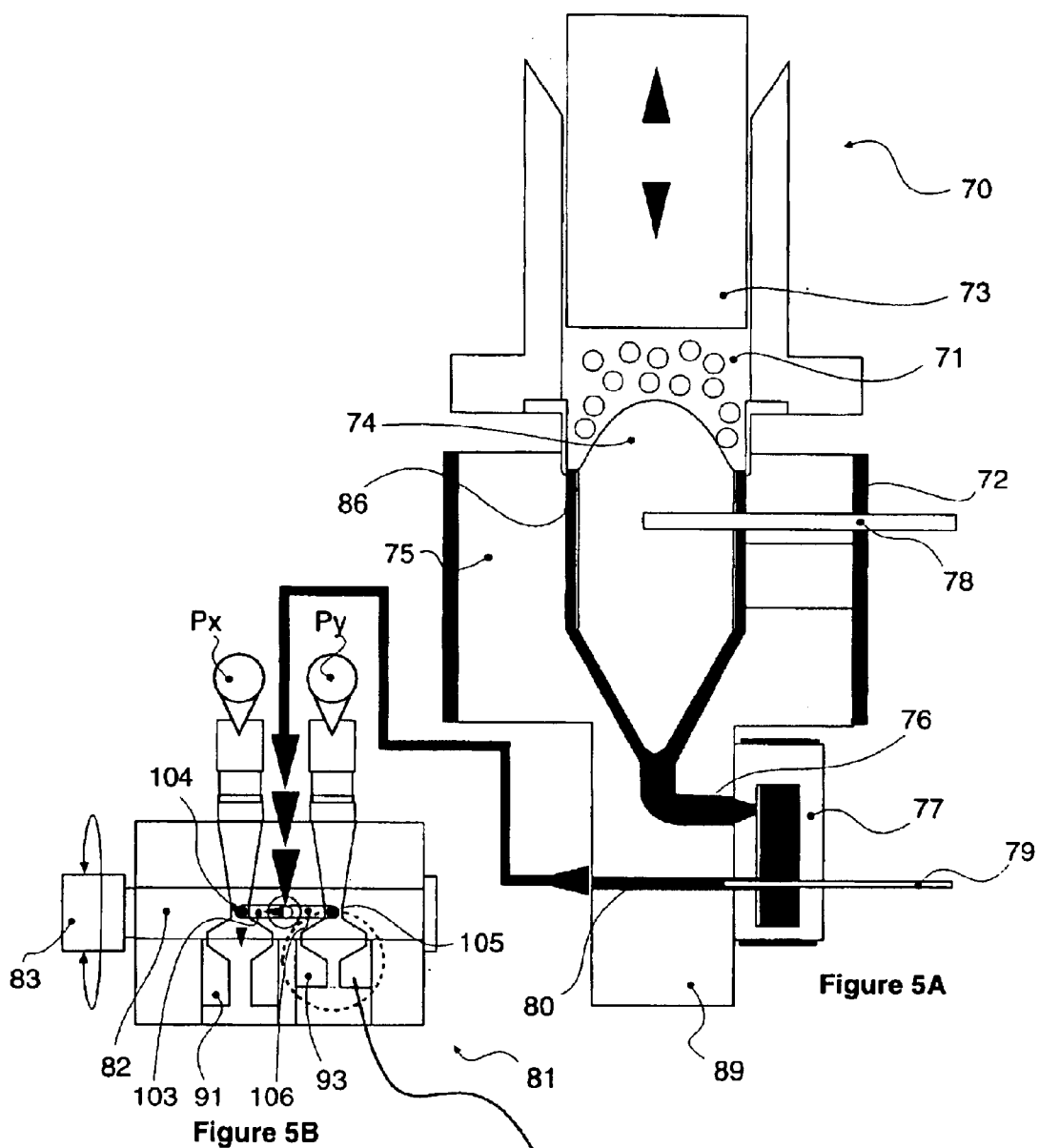
Figure 5A
Figure 5B
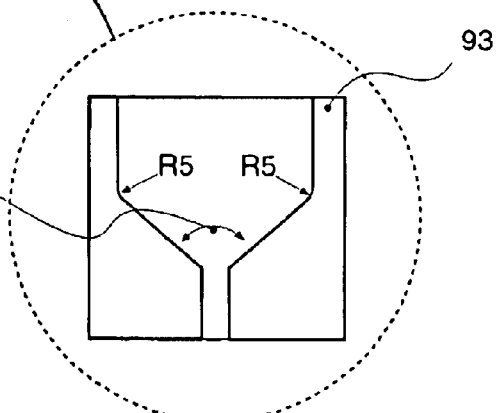
Figure 5C

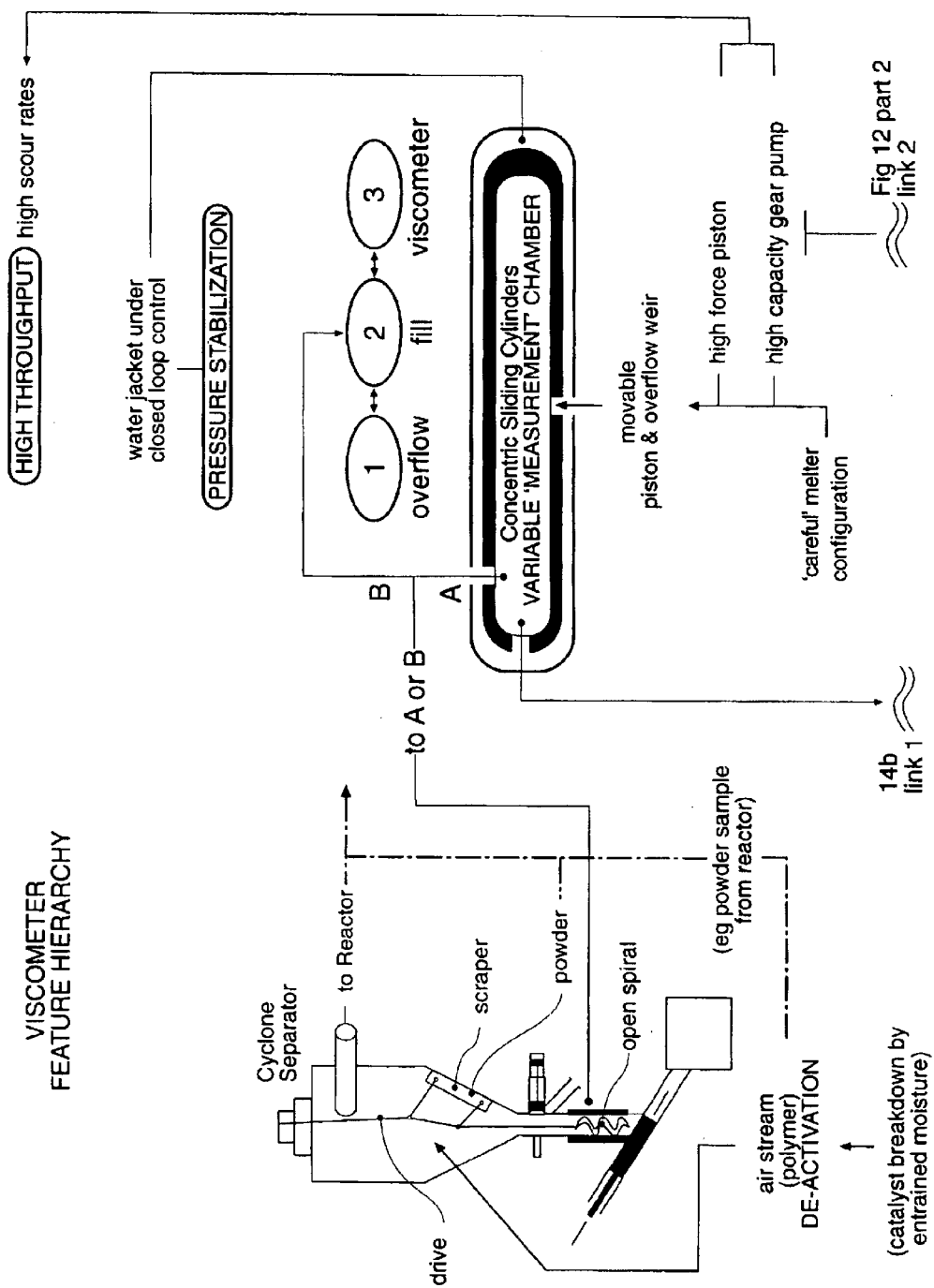
Figure 12 part 1

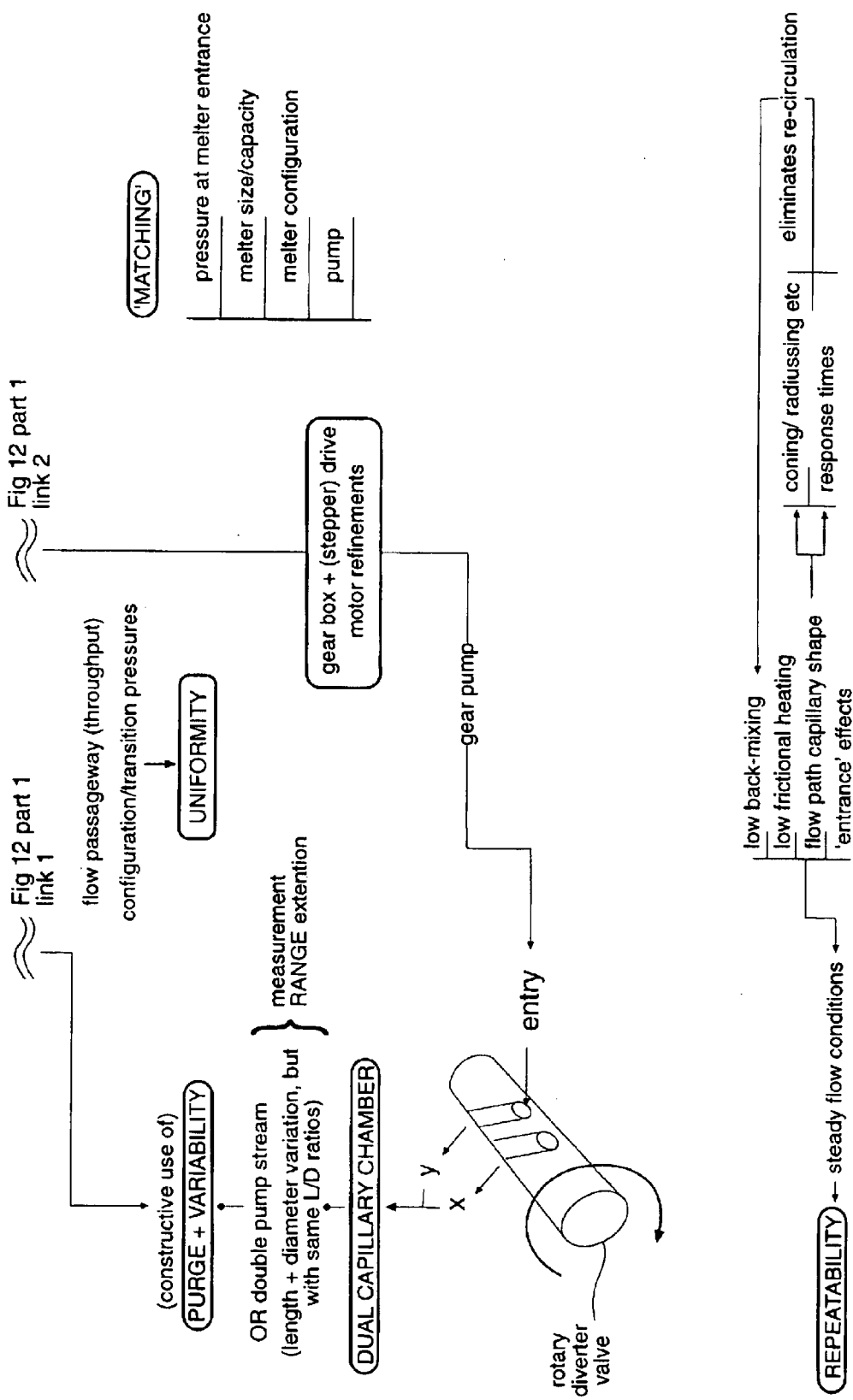
Figure 12 part 2

MELT FLOW INDEX DETERMINATION IN POLYMER PROCESS CONTROL

This invention relates to the determination of polymer characteristics. In practice, polymer is typically melt processed in onward production or 'conversion'—and so measurement of Melt Flow Index (MFI) is of particularly relevance.

Key polymer properties, such as tensile strength, solubility, impact resistance and melt viscosity, are associated with (average) molecular weight. For a given polymer, a higher molecular weight generally affords greater resistance to impact. On the other hand, lower molecular weight polymers are useful for thin films or filaments.

Polymer conversion requires close control of melt viscosity—which is related to molecular weight, so that:

the polymer 'melt viscosity' (or melt flow index—MFI) is suitable for the conversion process (such as moulding or extrusion); and a polymer product has desired physical characteristics.

To address this, most polymers are available in a range of average molecular weight grades. In practice, these grades are specified in terms of melt viscosity (MFI)—for example to 5% tolerance of target specification.

Melt viscosity is prescribed under a standard test regime, intended as 'static' and stable—and is routinely measured using a so-called 'manual grader', as specified in ASTM D 1238 standard; being 'reported' as 'melt flow index' (MFI).

However, the standard test is not readily achieved, or directly usable, for production control. The Applicants have devised an improved 'dynamic' test regime, which offers improved consistency and responsiveness—and admits the possibility of MFI as a polymer production control factor. Essentially, control of MFI requires control of average molecular weight during polymerisation.

In polymer production, rapid and reliable MFI measurement allows a more precise assessment of a polymerisation (reactor) output and so enables effective reactor process control—ultimately on-line and in real-time.

A polymerisation reaction typically generates polymer in a powder form, which is highly reactive and difficult to handle. This polymer powder is therefore commonly converted into a more stable, and 'user-friendly', granular or pelletised form, for collection, storage and onward transport to customer end users and re-processors.

Pelletisation or granulisation is typically undertaken in an extruder, as is any downstream (mechanical) mixing, blending and re-processing. Precise MFI knowledge during extrusion in such conversion and onward re-processing is just as relevant as in original polymerisation.

Overall, Aspects of the Invention Variously Address (MFI) viscometry for 'rapid-response' determination of polymerisation reaction output;

(on-line) reactor control through (MFI) viscometry; and post reaction powder-granule conversion and re-processor blending.

Polymerisation Catalytic Reaction Control

Polymers are commonly produced, ultimately as a fine powder particulate, by continuous catalytic polymerisation, initially in a gas and/or slurry phase.

Polymerisation is influenced, inter alia, by reaction time, temperature, pressure, monomer, catalyst and impurities concentrations in the reaction mixture.

A limited range of factors is available for such catalytic reaction control. Primarily, control of molecular weight is achieved through inhibition of chain growth. In turn, chain growth inhibition involves addition of a monomer inhibitor agent (a so-called Terminating Agent, Chain Transfer Agent or CTA), such as hydrogen.

More particularly, in (continuous) 'catalysed' polymerisation, to a target MFI specification, reaction is controlled by either:

the addition of a 'chain terminator', which reacts with a catalyst to stop polymerisation; or, more usually, the introduction of a 'chain transfer agent' (CTA), which reacts with the growing polymer chain, to prevent further polymerisation—but leaves the catalyst able to start polymerisation of a new chain.

Thus, both MFI determination and hydrogen (inhibitor) input control can be used constructively to control molecular weight.

Control of polymer chain growth is a 'delicate' process, with a need to relate reactor chain transfer agent concentration to molecular weight. The relationship is process dependant—taking account of individual reactor and catalyst characteristics.

WO9324533, EP002747 and U.S. Pat. No. 3,356,667 variously rely upon monitoring, and adjustment, of diverse reaction factors, such as temperature, pressure, CTA and/or monomer concentration—as a basis for computation and control of output polymer MFI. WO9641822 adopts a predominantly mathematical approach—but a significant time correction, between sampling and MFI result, must be factored into the analysis.

None of this art addresses direct, on-line, viscometric measurement of polymer output MFI, as a continuous on-line control factor—which in turn justifies special viscometric methodology and apparatus. Conventional viscometry is time-consuming, and performed off-line, commonly in laboratory controlled conditions.

Formative steps towards closed-loop control have been taken with the emergence of more reliable MFI measurement technology, such as the Applicants' own earlier work. An example is the Applicants' (model P5) viscometer and attendant interpolative (graphical) measurement technique—as taught in their UK Patent No. 2210466.

A polymerisation reaction (process) control aspect of the present invention places even greater reliance, upon responsive MFI measurement—and embraces refinements to the Applicants' (model P5) viscometer technology and attendant measurement technique.

Practical Difficulties of On-Line Process Control

In practice, it can be very difficult to maintain completely steady conditions in the reactor. Disturbances in changing grades to the are inevitable—with attendant MFI 'drift' from target specification. Frequent MFI measurements on polymer from the reactor guide adjustments in the flow of chain transfer agent, to correct any such drift.

Failure to compensate adequately for disturbances results in material properties outside prescribed MFI limits, and so one which must be sold at a substantial discount compared to 'first (or consistently to specification) grade' polymer.

These 'downgrading' (or off-specification) losses can be reduced by post-reaction blending of product and restricting the frequency of grade changes—but the capital equipment and attendant running costs are high and there are limits to the 'spread' of MFI's which can be dealt with in this way.

The number of 'grade' changes can be reduced by making larger-quantities of each grade at longer intervals, but the cost of the higher stock levels needed eventually outweighs the benefits. Despite this, between some 5–15% of product of conventional process control regimes is commonly downgraded by poor MFI control. Even 'good' product produced by this approach has a large 'scatter' of MFI.

In a typical case, the chance of a customer end user or re-processor receiving two successive batches at opposite extremes of the MFI range could be 1 in 26, rather than 1 in 1600 or more if effective MFI control were used.

Such poor performance is the result of inadequate, or inaccurate, understanding of the relationship between MFI and concentration (or flow) of chain transfer agents (or terminators). This applies to both 'steady state' and dynamic conditions.

System Errors

The relationship is often totally obscured by a series of system errors, such as:

Inaccurate measurement of MFI. Studies of the manual method by the ASTM (standards body), allied to industrial experience, have shown that a standard deviation of 5% in the middle of the operating range, rising to 15% at the upper and lower limits, can be expected for a single (given) reading.

Although other means of 'measuring' MFI exist which give lower scatter, the relationship between their values and MFI are neither simple nor consistent. This introduces an equally serious error.

Unrepresentative samples of reactor product.

In many cases the sampling device is incorrectly designed and/or situated, so that a sample drawn is not representative of reactor contents.

Variation in pre-conditioning required to remove monomer and active catalyst.

Degradation of the polymer before or during measurement.

Ex-reactor polymer often contains catalyst, which will react during melting and alter MFI, unless de-activated. The polymer also contains no anti-oxidants and will be chemically degraded if melted in a conventional extruder. If the polymer has been exposed to air (with its oxygen component), this degradation will be much more severe. Existing methods of treating the polymer to avoid these problems during manual measurement are too slow.

Delay between events in the reactor and MFI measurement.

In hitherto known practice, a large deviation in MFI has to occur before a decision to apply a correction could be made. This adds 'dead time' to that already present in the reaction system and often makes control almost impossible.

Other problems of a 'manual' grading technique are measurement times varying from some 20 to 50 minutes (depending on MFI), and delays entailed in sample collection and pre-treatment and cleaning of apparatus, with attendant costs.

Other sources of delay are placement of the sampler downstream of the reactor, the time required to deactivate the catalyst and/or remove monomers and the time to take the MFI measurement. Using manual methods, the last two alone will typically give a dead time elapse of some 30–80 minutes (depending on MFI), before any MFI deviation is detected. Typically, the combined effect of these factors results in the aforementioned 'downgrading' of 5 to 15% polymer produced.

Inaccurate measurement of concentration of the chain terminator or transfer agent.

Typical causes are incorrect choice or poor maintenance of the measuring instrument, and poor position of the sampling point, giving unrepresentative samples or physical changes (eg condensation) between sampling and measurement. In some cases concentration cannot be measured and flow into the reactor must be used. As the reactor input/output flows involved are relatively small, poor instrument choice or maintenance will give serious errors.

If the errors and delays attendant the foregoing contributory factors are substantially reduced, the more meaningful (measurement) data obtained opens up the prospect of closed-loop control of MFI in continuous catalysed polymerisation.

In principle, accurate measurement of flow and/or concentration of chain transfer or terminating agents requires only the application of known techniques. However, it has not hitherto been practical to overcome the aforementioned problems of MFI inaccuracy, representative sampling, sample degradation and measurement delay.

Statements of Invention

According to one aspect of the invention, a method of closed-loop regulation and/or control, of polymerisation, in a reactor (11), using a chain transfer agent (CTA), to determine average polymer chain length; the method comprising the steps of: periodic selection, isolation and conditioning of discrete samples of reactor polymer output; direct, on-line, viscometric melt flow index (MFI) sample measurement; comparison between a directly measured sample MFI value and a desired or target reactor polymer output MFI value; periodic adjustment of chain transfer agent (CTA) supply to the reactor, according to ongoing sample MFI determination.

Preferably, successive samples of reactor polymer output are individually isolated, conditioned and stabilised in a sampler (50), passed through a cyclone separator (12), into an accumulator (14), and then to an a MFI test viscometer (15), configured for repeated, isolated sample MFI determination.

Such polymerisation control methodology, may include the step of sample deactivation, through the introduction of a catalyst inhibiting agent, such as isopropanol, prior to sample viscometric measurement.

According to another aspect of the invention, polymerisation reactor control apparatus, for the above method of polymerisation reaction control, include: a CTA supply (21), a CTA flow meter (23), a CTA flow regulator (22), fitted between the CTA supply (21) and reactor (11), a CTA flow comparator (24), a CTA concentration set point unit (29/24), a CTA concentration controller (28), an MFI comparator (27/28), an MFI set point unit (31), a viscometer (15), for sample MFI determination, the reactor CTA concentration being controlled by the CTA flow regulator, in accordance with sample MFI determination by the viscometer.

Desirably, the CTA flow regulator (22) comprises a valve, controlled by a flow control signal (34), derived by the CTA flow comparator (24), from a CTA flow set-point control output (43/42), based upon the viscometer MFI determination, and actual CTA flow input (44), derived from the CTA flow meter (23).

Conveniently, a measurement output (38) from the viscometer (15), is applied to an MFI comparator (27/28), together with a reference signal (39), from the MFI (target) set-point unit (31), to produce an MFI correction factor, for the CTA concentration controller (28), which issues a set command (42), taken into account by a CTA flow comparator-controller (24), to generate the flow control output (34).

Preferably, the concentration of CTA in the reactor (11), is monitored, through a tapping (36),with a sensing (gas) chromatograph (19), the chromatograph sensing output (37) being applied as an input to the CTA concentration controller (28).

In practice, successive reactor output samples are individually isolated, stabilised and pressure-conditioned,upon transfer from the reactor to the cyclone separator (12), via the sampler (50).

Nitrogen gas (N2) may be employed as a sample transfer medium,between reactor and sample MFI determination viscometer.

In a particular example,polymerisation reactor control apparatus, includes a cyclone separator (12), a funnel (63), a ram compaction chamber (71), connected to the funnel, a compaction ram (73), movable within the compaction chamber, a melter (74) connected to the compaction chamber, a gear pump (77), connected to the melter output, a measurement die block (81), connected to the gear pump output; wherein MFI determination is undertaken upon sample material from the cyclone separator,once collected, mixed and temperature pre-conditioned in the funnel, discharged into the compaction chamber, and consolidated upon the melter by the compaction ram, whereupon a conditioned sample melt stream (80) is delivered by the gear pump, to the die block for MFI test flow measurement.

Another aspect of the invention provides a sample isolator, for the polymerisation reactor control apparatus, as claimed in any of claims 4 through 10, including an isolation chamber, for temporary storage of a sample of polymer output; a multiple port rotary valve, with a rotary valve member, having a diametral passage, serving as a sample conditioning and transfer chamber, and selectively alignable with circumferential ports, connected to transfer, conditioning, discharge and flushing media; whereby, upon receiving polymer sample from the isolation chamber, the chamber is connected successively with respective ports, to effect sample conditioning, including deactivation and addition of transfer medium, [prior to] discharge for viscometric determination; further port connection effecting vacuum flushing, to purge remaining polymer, and valve cooling, following sample discharge.

Yet another aspect of the invention provides a viscometer for MFI determination, for the polymerisation control method or apparatus, a rotary diverter valve (82), in a die block (81), incorporating a plurality of relatively angled capillaries, for output polymer sample diversion, to a selected one of multiple measurement dies (91, 93), subject to differential respective pressure heads (Px, Py), for MFI viscometric test conditioning, without interruption for measurement head change.

A linear reciprocating shuttle valve may be used to selectively divert a polymer sample, to a viscometer, or waste discharge.

According to a further aspect of the invention, a polymer (reactor/reaction) process control method, comprises the steps of: applying a chain transfer agent (CTA) to a reactor, to control a polymerisation reaction within the reactor, measuring the melt flow index (MFI) of a '(pre-) conditioned' sample of reactor polymer output, determining and applying a CTA concentration correction, according to a preceding sample MFI determination, and measuring the effect upon reactor (sampled) output MFI; continuing successive output sampling MFI measurement and attendant CTA (flow) adjustment, to stabilise reactor output to desired MFI target criteria.

The invention also provides a polymerisation process control method of reactor polymer output MFI, by selection, conditioning and measurement determination, of successive reactor samples, isolated from the reactor (environment)and purged or neutralised of CTA, to suppress ongoing reactivity and promote sample stability and representation of reactor polymer output; sample MFI determination being conducted after initially flushing the sample, with a neutralising, and anti-oxidising, agent; such MFI sample determination being effected continually/periodically, to update/adjust CTA flow and thus reaction conditions and polymer output, so that the polymer output characteristics are pre-determined.

The invention also embraces a method of control of melt flow index (MFI) of polymer output, (in a continuous, catalysed, gas and/or slurry-phase, polymerisation reaction process), by use of a chain transfer agent (CTA), such as hydrogen,the method including the steps of: measuring CTA concentration, by conducting gas chromatography on reactor process environment, measurement of actual CTA flow to the reactor, MFI determination of a selected discrete sample of reactor polymer output, comparison of sample MFI with a target MFI set point, generation, from the MFI comparison, of a target CTA concentration set point, comparison of actual CTA concentration, with the CTA concentration set point, adjustment of CTA concentration in response to actual CTA concentration, actual CTA flow, and CTA concentration set point, by adjusting CTA flow to the reactor.

Desirably, a method of polymer process control, includes taking samples to a set target size, in the size range from 80 to 120 gms, to a tolerance of not more than 5%; freeing samples substantially of monomer and active catalyst, to inhibit changes in MFI during subsequent sample MFI determination, and reducing fire or toxic hazards, keeping the total time for sampling, transfer and de-activation to less than the cycle time of a viscometer undertaking sample MFI determination.

Preferably, an MFI process control method, includes the step of suppressing sample degradation, before sample MFI determination, by trickling isopropanol vapour, from a boiler generator, into an air purge, both as an anti-oxidant, and to prevent sample contamination, by the presence of oxidisation.

Sample Measurement Refinement

Time Lag

Although catalytic polymerisation reactors may not have an obvious product 'transportation delay', many of them exhibit a 'dead time'in the relationship between MFI and (CTA), or flow of CTA, and which is of the same magnitude as the first order lag time and is related to the polymerisation rate.

In practice, resolution of this requires a facility, encompassed by preferred embodiments of the invention, for anticipation of a first order time lag, related to the polymerisation rate of 'continuous stirred tank' reactors;

In these circumstances, the control algorithm employed by preferred embodiments of the invention reflects the significant dead times and first order dynamics exhibited by polymerisation reactions. This requires considerable modification of, or departure from, conventional dead time process control algorithms.

Sampling Interval

In practice, the Applicants have found that the interval between samples is related to the interval between reactor discharge 'pulses' —which is in turn linked to polymer 'make-rate' and 'bed level' within the reactor.

Thus the assumption of fixed measurement intervals inherent in conventional process control schemes is invalid, especially where a major disturbance is present.

Rather, in preferred embodiments of the invention, statistical techniques are employed to update the process model and evaluate the reality and magnitude of the predictions obtained from it.

Catalyst De-Activation

If a sample remains reactive, it is no longer representative of reactor contents. Hence the provision, in preferred embodiments of the invention of sample deactivation.

Thus, for example, polymer is exposed to 10 to 13% oxygen, at 80 to 110 C., for 2 to 4 minutes, to deactivate second-generation, so-called 'Ziegler-Natta' catalysts;

Catalyst retention would otherwise promote ongoing reaction and change in MFI from that characterising reactor conditions.

Digital Controllers

Generally, analogue controllers are unsuitable, but in preferred embodiments of the invention, digital hardware, using model-based control, such as the so-called Dahlin algorithm, is employed. The software can be incorporated in the Applicants' (model P5) viscometer.

Overall, reactor sampling for MFI determination and polymerisation control according to preferred embodiments of the invention must satisfy the following requirements:
 a the sample is representative of the reactor contents;
 sampling delay is less than 1.5 minutes from sample request;
 sample size is set between 80 and 120 gms—desirably for consumption within a single measurement cycle—and does not vary from the set value by more than 5%, to avoid sample segregation;
 samples are free of monomer and active catalyst, such that no fire or toxic hazard is presented and no changes in MFI take place during MFI measurement;
 the total time for sampling, transfer and de-activation is less than the cycle time for the (say Applicants' model P5) viscometer; and
 the catalyst is treated chemically, so that it will not react with the polymer during measurement to alter MFI.

In effectively addressing such process criteria—in conjunction with MFI viscometry refinement, discussed later—preferred embodiments of the present invention make closed loop control of MFI a practicable proposition.

MFI Determination Viscometry

Hitherto, reliance upon 'standard' MFI measurements has contributed to poor MFI control in polymerisation.

Over the last some 20 years, viscometer designs have sought to improve accuracy and/or speed of MFI measurement.

Some retain a constant pressure approach, reflecting the standard MFI laboratory test conditions, but use a variable speed pump with a continuous polymer feed.

However, such units can be no taster than a 'manual grader', as the viscoelastic polymer melts are slow to respond to a change in flow rate.

Other designs use different mechanical arrangements to derive melt viscosity data, but their data is not simply and predictably related to the 'manual' MFI values—which (despite their limitations) remain an industry standard.

Many continuous flow viscometers have relatively large internal volumes and small throughput, so that their readings are delayed for long and variable times.

Most use a screw extruder to melt the polymer prior to measurement.

As polymer samples from the reactor have no anti-oxidant present, oxygen entrained by the screw attacks the chains during melting, reducing average chain length. Large, unpredictable errors in MFI are the result.

As a precursor to MFI measurement, the use of a ram for (sample) melting, in preferred embodiments of the invention, substantially removes air or other deactivating agent from the sample before melting commences, so degradation of (polymer) chain length from this cause can be avoided.

Viscometer design and construction factors become particularly acute with the constructive use of MFI in reactor process control for (catalytic) production of polymer—which is contingent upon prompt and reliable 'real time' measurement of melt flow index.

An objective is the use of MFI as an active feedback (correction) factor, in on-line, closed-loop (polymerisation) process control—to produce polymer to prescribed standards or characteristics.

Generally, 'squeezing or squashing' polymer through a (measurement or process) die, in conventional viscometry, folds up the polymer chain and distorts its characteristics, impeding a satisfactory melt flow index determination.

The Applicants have evolved a measurement regime of melt index determination by a graphical interpolation technique—the basis for which is taught in the Applicants' UK Patent No. 2,210,466, as utilised in their model P5 viscometer. The results of the Applicants' MFI test conform closely to the standard test.

More specifically, reflecting MFI measurement precision, in a plot of Log MFI readings from the Applicants' model P5 viscometer, against Log MFI of readings from the standard laboratory or manual test, the 'mutual calibration' curve departs somewhat from an 'ideal' 45 degree or 1:1 ramp ratio sloping line, to a slight, but consistent, departure slope of 1.0163, for a granular product.

This useful 'conformity' arises from a low shear rate measurement attendant relatively slow flow. Thus, in the Applicants' viscometry technique, the polymer 'structure' under test is not extended too far. This same shear rate is consistent, over a large range, with molecular weight—otherwise the test would only reflect visco-elasticity or 'stickiness' and viscous drag.

Through sample de-activation, such as with polar fluids, a substantially parallel (allowing for small scatter) comparative plot with a standard test is achieved, with a small offset. With improved reactor sample de-activation, such as with isopropanol, prior to testing, an almost coincident plot is forseeable.

Viscometer Refinement

Viscometry aspects of the present invention address improvements in the Applicants' model P5 viscometer, enabling closed loop polymer reactor process control using MFI as a variable control factor.

Thus, for example, enhancements to critical viscometer constructional features include:
 high throughput; with a high force piston, high capacity (eg 1.186 cc) gear pump and careful melter configuration, to achieve high flow rates of molten (polymer) sample product, of uniform output stream temperature;

careful matching of the shapes and sizes of certain key components and attendant operational forces; such as in particular:
  pressure at the melter entrance;
  actual melter size/capacity;
  melter top, gap and tail cone shape/profile; and
  pump sizing/capacity, relative to melter (surface) area; singly and in co-operative combination.

uniformity of molten (polymer) product, by careful use of flow passage tapers and transitions, without the use of large volume and long passageways, which produce large delays and product back-mixing;

This strategy applies to all the viscometer 'wetted' parts, in the passage of a polymer sample through the viscometer.

low back-mixing in the (gear) pump, with pump swept volume/dead volume ratio optimised for the throughput used;

low frictional heating in the polymer, with a (gear) pump construction employing relief grooves at the delivery side and a 'gentle' tooth profile;

critical flow path capillary shape profiling;

Thus a combination of offset tangential feed to the capillary entry chamber, with a shallow (polymer dependent—but, say, 118 degree) included cone angle to capillary and a (say, 5 mm) radius between cone angle and entry chamber cylinder walls contribute to very low turbulence and back mixing in the capillary entry chamber.

Such cone angles and edge transition radii admit of variation and are not restricted to a simple cone angle, but embrace more complex forms, such as those illustrated in FIG. 5C.

These shapes make significant contributions to the overall response time of the viscometer, when changing from one material to another. The design is considerably faster than a chamber having no radius or no cone or no tangential entry.

The entrance effect is close to the entrance effect of the stepped configuration, because the flow of polymer fluid naturally follows close to the above shape when the flow becomes fully established, with a small recirculation component filling the corner of a stepped entry, which is polymer dependant.

Coning and radiusing eliminate the re-circulation phenomena and give virtually zero back-mixing. This in turn produces very steady flow conditions, with a high threshold for the (adverse) flow phenomenum known as melt fracture.

Steady flow contributes to a highly repeatable measurement, because the contributions of elastic and transitory components are minimised. The system settles to steady flow faster than with a series of harsh transitions and corners in the melt passageways. The cone entry effect is erroneously computed using standard equations for steady flow.

adoption, in some variants, of multiple, in particular dual or triple, capillary chambers, addressed by a single pump stream;

Such an arrangement is suitable for discrete charges of material, where there is a practical restriction on flow rate.

In a particular construction, the dual chamber has a plug valve to divert flow at a gear pump exit. This plug valve has a rotary valve member relying upon a plane ground shaft in a honed bore to effect sealing against the escape of test sample polymer. The valve is rotated by a pneumatic rotary actuator, using end stops of the actuator to obtain, 0, 90 and 180 degree (angular rotational) positions.

In one valve position, the flow is directed to one of the test chambers through an angled gallery in the valve member shaft itself. A corresponding arrangement prevails in another chamber, when the shaft is rotated to a second position. Small misalignments are allowed for by the use of ball-ended keys on the shaft ends.

Overall, this arrangement has a low volume and simplicity and avoids the need for a dual pump or planetary pump, which would have to run at a higher melting rate, (usually twice the rate used for a single pump), thus saving on the required melting rate of the system. This in turn allows a variable flow rate and use of dissimilar capillaries.

In particular, the following capillary operating combinations are available:

zero length capillary and long capillary having the same entrance geometries—for extensional viscosity calculations on filming polymers;

two capillaries of differing diameters, but of same entrance geometries and same L/D ratios—for multi-weight MFI determinations over very large product ranges;

two capillaries of same diameters and entry geometry, but differing lengths, to obtain sample shear stress/shear rate information.

an alternative, dual capillary chamber arrangement addresses a dual pump stream, and as such is suitable for discrete charges of material, where there is no restriction in flow rate, as would be the case with an extruder-mounted rheometer;

Such a double pump is appropriate when rapid changes in polymer properties have to be monitored, as for reaction extrusion requiring a comprehensive rheological test on the passing materials.

As to a dual shear rate measurement cycle itself, improvements include:

range extension on each capillary—achieved by selection of two flow rates which straddle MFI test pressure for each material each time;

inclusion of a purge rate in each cycle, the purge having four functions; viz:
1. high clear-out ratio of old material from the measurement chamber;
2. balancing of the total quantity of material used in each test cycle;
3. total consumption of the quantity obtained in a discrete sample in each discrete test cycle;
4. balancing of response time, as defined by sampling to measurement time, by using a variable purge rate to compensate for variable flow rate, so that the amount of material consumed in each cycle is constant.

Generally, high flow rates have a better scour effect than low flow rates. There comes a point with each material where the flow rate achieves a scour that is independent of the direction of change—ie the hard to soft material transition is normally slower than the soft to hard transition.

These flow rates can only be achieved, according to preferred embodiments of the invention, when the passageways have smooth transitions as in the Applicants' (models P3 and P5) viscometer geometries and the gear pump has a sufficient volume throughput to achieve these flow rates.

Rough transitions, particularly in the capillary entrance, and low volume pumps suffer from limitations due to the onset of melt fracture, which occurs before a sufficiently high purge rate has been achieved.

The choice of gear pump size at 1.186 cc/rev gives near optimum conditions, which would not, in the configuration used, be achieved with other pump sizes, such as 0.2 cc/rev or 0.584 cc/rev, commonly employed in conventional viscometers.

The Applicants have observed, with viscometer embodiments of the invention, the rapid clear-out phenomena in the region of 40 g/minute and 120 g/minute on various polymers. 120 g/min is close to the upper limit of the melt delivery of the liquid or solid fed rheometers.

In practice, with preferred embodiments of viscometers according to the invention, a purge is undertaken at the beginning of the cycle to clear old materials to the new. An estimation of the correct first flow rate of the MFI test is made by comparison of the running pressure with the required pressure to be at a fixed point just below the MFI test pressure. The flow rate is reduced in rapid stages, until the result is achieved—at which point an MFI test begins. This procedure allows progress to the desired conditions of the test in the minimum time.

Discrete flow rates and pressure measurements are used, rather than the alternative method of measuring flow rate at fixed pressure. This avoids the pitfall of the constant pressure method, which is forced to have a slow response time in order to avoid oscillatory and hence inaccurate measurement of MFI.

If the constant pressure method uses alternate purge and constant pressure sections in its measurement, it will spend a longer period in the settling than the purge and dual shear rate method and hence will have a slower response time.

Constant pressure methods, for non-powder product, attempt to compensate for their inherent slow response time at low MFI values, by introducing a high flow by pass route to the measurement flow. This only goes so far and does not compete in response times of the single pump method described above.

The best figures for the two methods are 7 minutes for a bypass pump equipment mounted on an extruder. The equivalent figure for a version of the Applicants' model P5 viscometer according to a preferred embodiment of the invention, is 3 minutes. Generally, the Applicants' model P5 viscometer achieves 4 to 5 minutes—including remelting.

For pressure transducer stabilisation, a preferred embodiment of the Applicants' (model P5) viscometer according to the invention employs:

a jacket heater under conventional closed-loop control, to stabilise the sensor and the mercury pressurisation fluid in the sensor envelope; and a pressure transducer of the mercury filled type.

The heater stabilises two out of three effects seen by the transducer, which contribute to approximately 66% of the two variations of the devices. The remaining uncompensated fluctuation is in the stem and transfer volume of the mercury filling. Overall, the accuracy of the transducer is enhanced by factor of three.

The push rod pressure transducers which have very similar performance to mercury types can be enhanced by thermal stabilisation around the strain gauge.

Further enhancements are gained by the calibration in the region of operation against pressure standards—resulting in an overall performance that is close to 0.1% accuracy, as opposed to the 1.0% of the standard device.

More sophisticated pressure transducers, with silicon encapsulation or sampling technology, obviate the need for stabilisation, because the strain gauge elements are situated in an existing temperature controlled zone.

The high throughput required by rheometers are only obtainable if a high efficiency gear box and high power motor combination are used. Refinements in gearbox and motor combinations, in preferred embodiments of the Applicants' model P5 viscometer according to the invention include:

use of a pinion reduction gearbox and stepping motor under micro-stepping control; and axial alignment of the motor to the gear pump by a pegged assembly that through-locates the gear box output shaft to the gear pump location dowels.

In a particular construction, drive from final gear to the gear pump is through a replaceable shaft, locating at the pump end by a barrelled hexagon drive peg, to mate with a gear pump drive plug. The gear box final pinion has an internal gear wheel, mating with a barrelled pinion on the other end of the drive shaft.

This gives such low gear box backlash and cyclic variation, that any orientation of the gear pump gives close to ideal delivery of polymer—which is essential for repeatable polymer flow conditions and the consequent accuracy of the rheometer.

In a preferred construction, the Applicants' model P5 viscometer employs direct measurement of polymer temperature; thus:

the gear pump has a thermometer secured in the centre of it's exit stream, to obtain an accurate temperature of the polymer on the way to the capillary.

The pump is modified to allow this placement. This has the advantage of a thermometer pocket, without the flow disturbance of a right-angled placement. The thermometer does not suffer side forces associated with a right angled placement, so that a narrow section sensor, 3 mm diameter, can be employed, giving faster response time and minimal intrusion to the flow. The leads of the thermometer are brought out to a convenient place with this construction.

Refinements to solids sampling handling in preferred embodiments of the Applicants' model P5 viscometer according to the invention, include:

use of the piston itself, in conjunction with an 'overflow weir', to provide a defined sample chamber;

creating a variable sample chamber, for example by a sliding interfit of concentric cylinders, carrying an overflow chamber above them; and provision of manual or motorised adjustment to the overflow chamber.

The adjustable sample chamber allows the purge flow rate to be maintained at a constant rate and quantity—which eases the clear-out problem of a rheometer running a variable purge rate to effect a constant throughput. The purge quantity can therefore be constant and the measurement quantity can be variable.

Any residue left over from these first two stages is removed with another third stage purge, which endures until the quantity of sample delivered is fully consumed.

There now follows a description of some particular embodiments, by way of example only, of principal aspects of the invention, namely:

polymer reactor control by on-line MFI measurement;

post-reactor (extruder) conversion (ie granulation or pelletisation from powder) and re-processor blending control by on-line MFI measurement; and viscometer construction, configuration and operation for on-line MFI measurement for reactor or re-processor control;

with reference to, and as shown in, the accompanying diagrammatic and schematic drawings, in which:

In relation to (on-line) polymerisation sampling and control:

BRIEF DESCRIPTION OF DRAWINGS

FIG. 1B shows a simplified version of FIG. 1A, adopting standard notation to differentiate product flow from electrical measurement and control signal paths;

FIG. 4A shows a variable sample chamber, for charging an MFI measurement viscometer;

FIG. 4B shows an alternative variable sampler to that of FIG. 3A, with a rotary sampler disk;

Figure 1A:
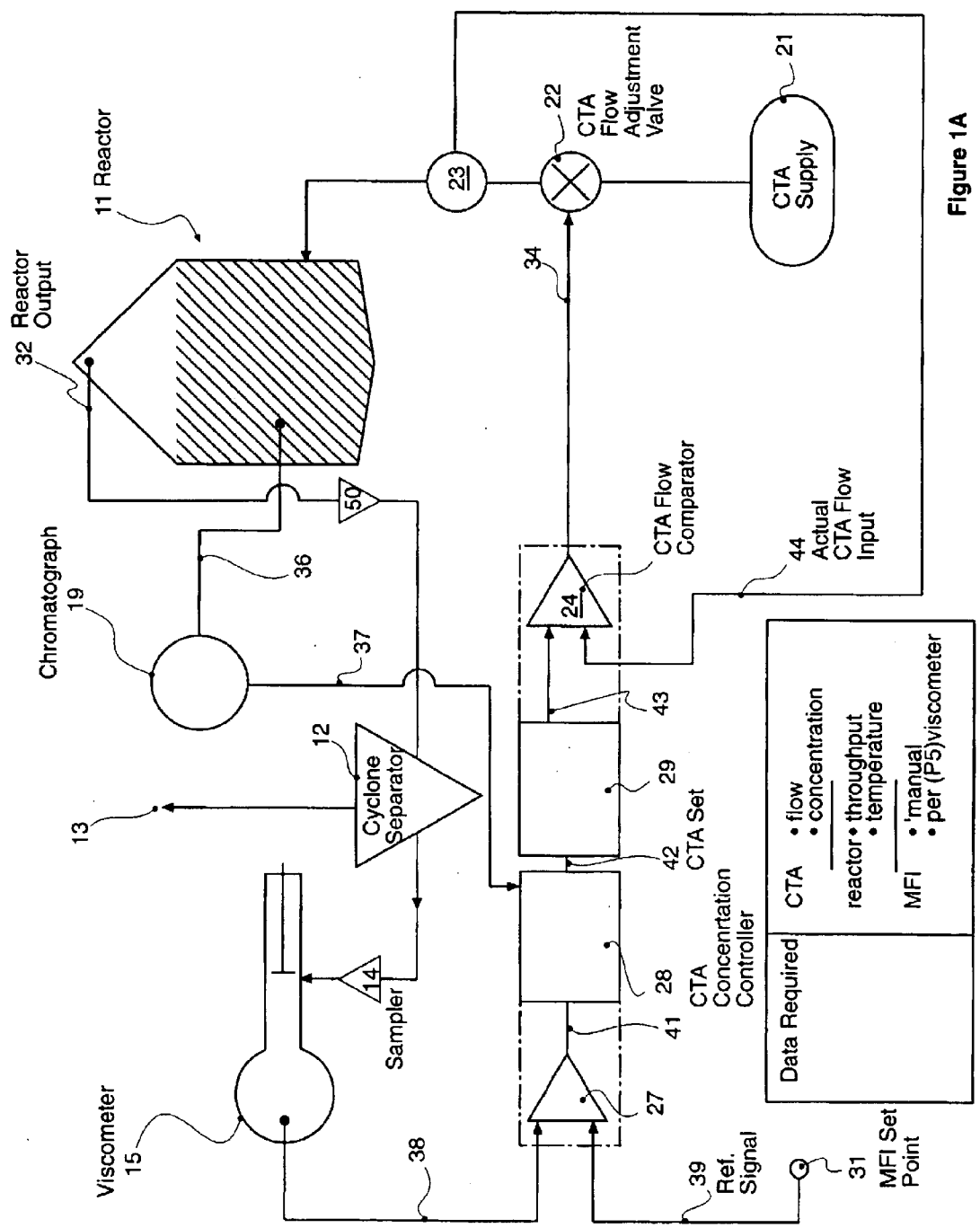
FIG. 1A shows a closed-loop control cycle for a catalytic polymer reactor, with on-line sampling, MFI measurement and real-time feedback, and polymer chain length formation regulated through a chain transfer agent (CTA) under MFI influence.
Figure 2:
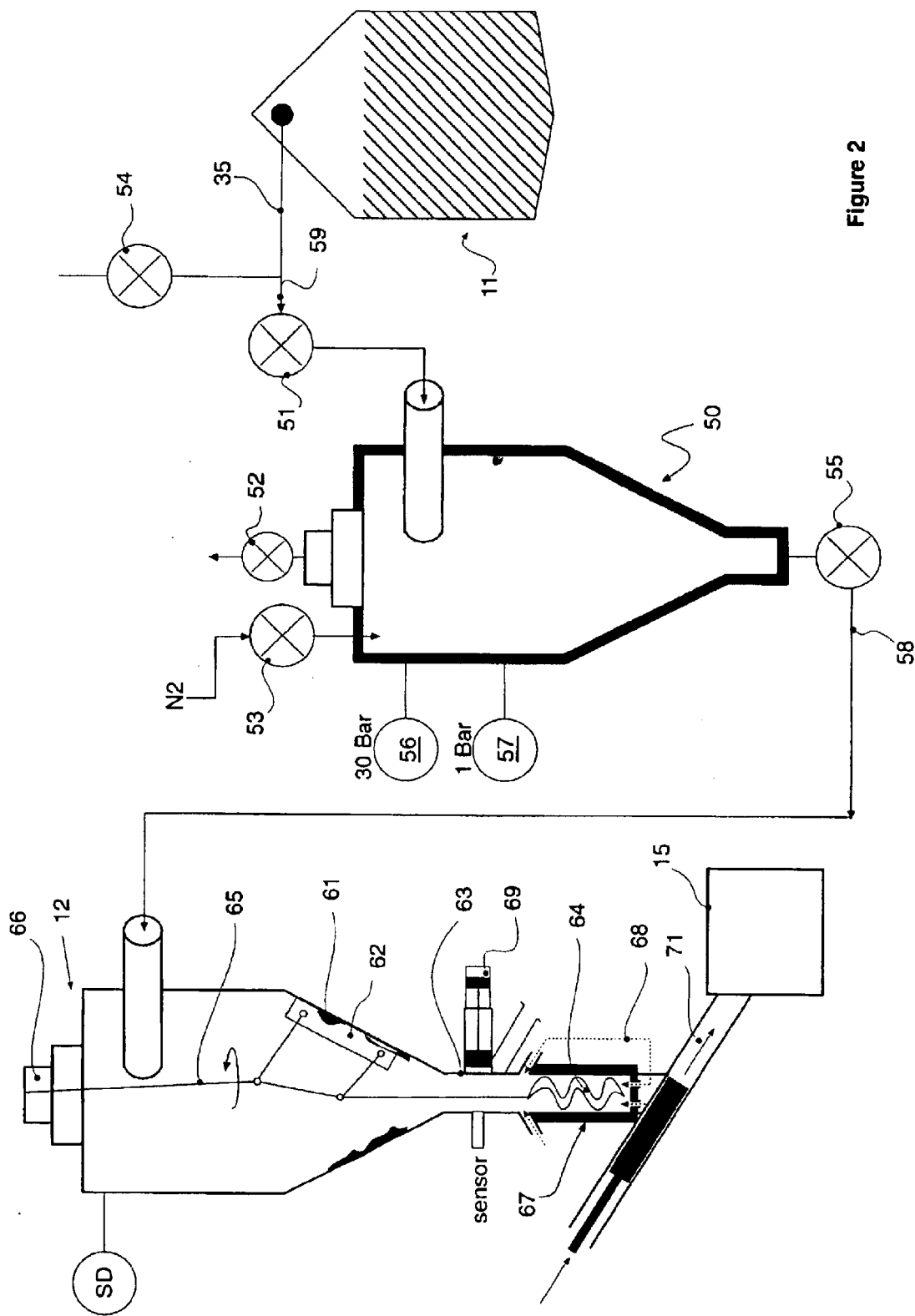
FIG. 2 shows reactor sampling, transfer, separation and de-activation, prefacing MFI measurement, in the control cycle of FIG. 1.
Figure 6:
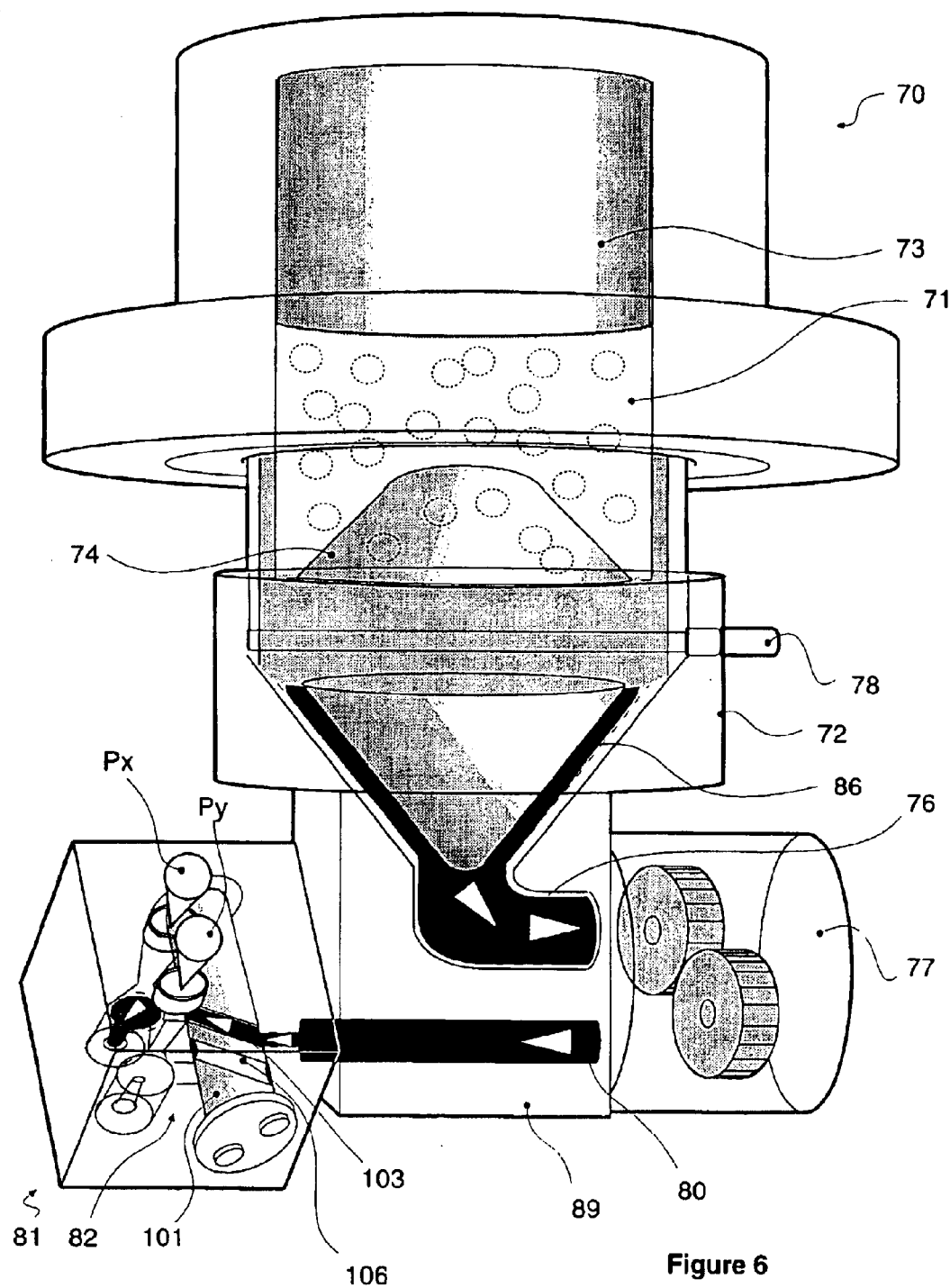
Figure 7:
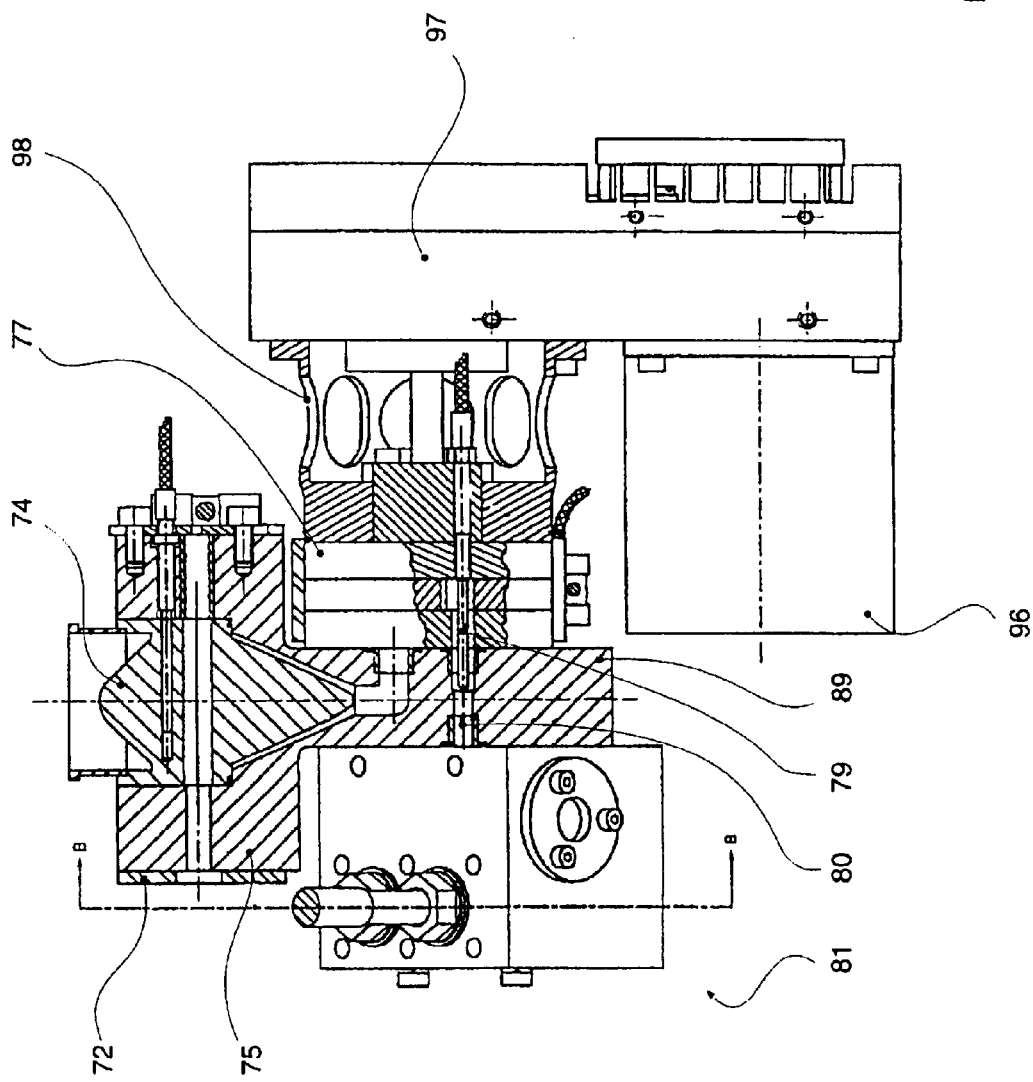
Figure 8:
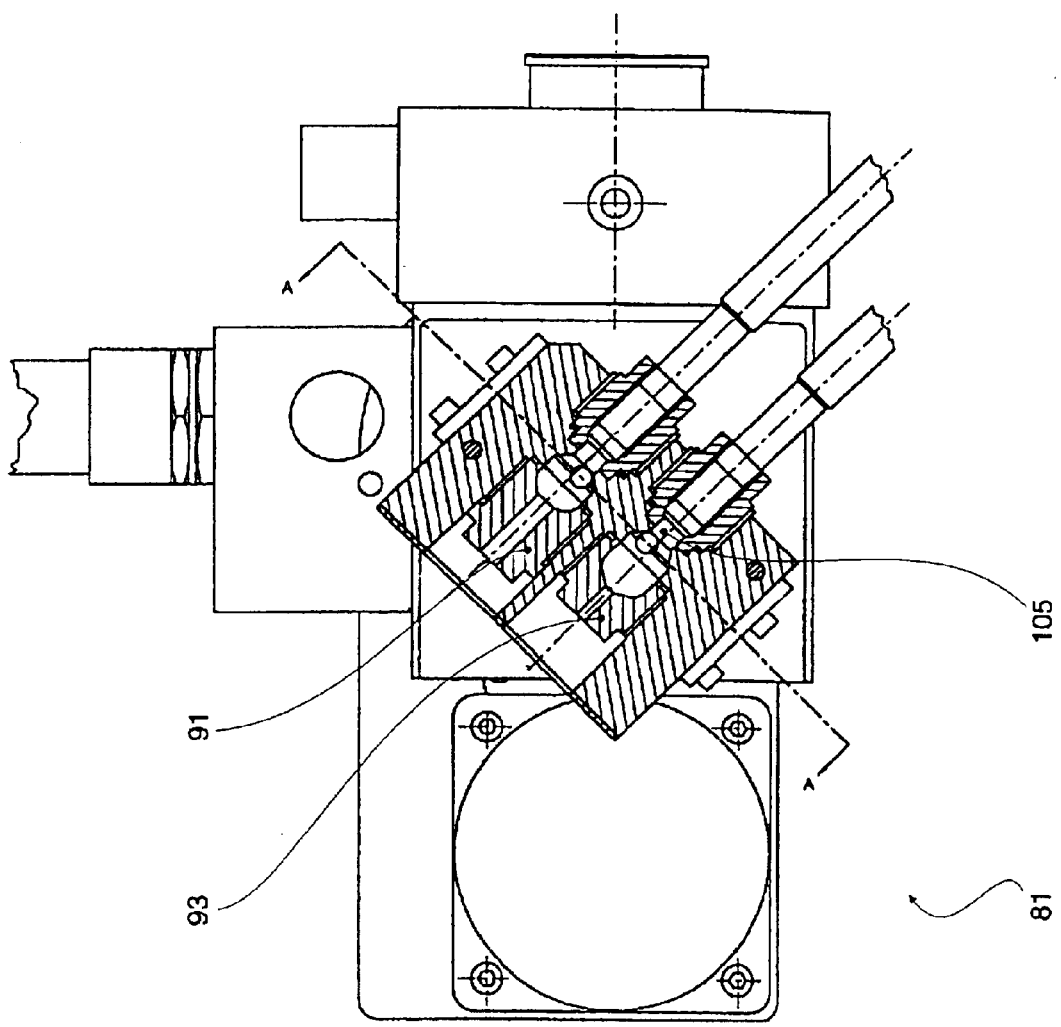
Figure 9:
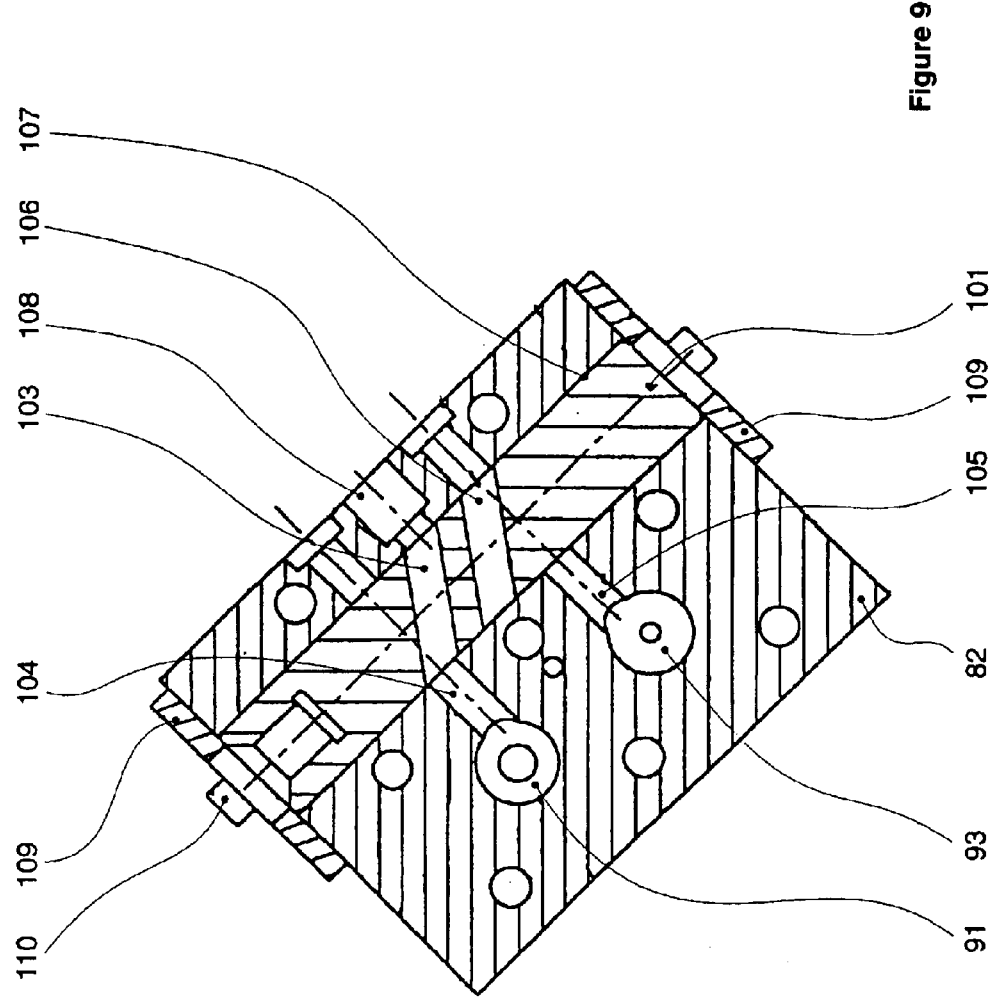
Figure 10:
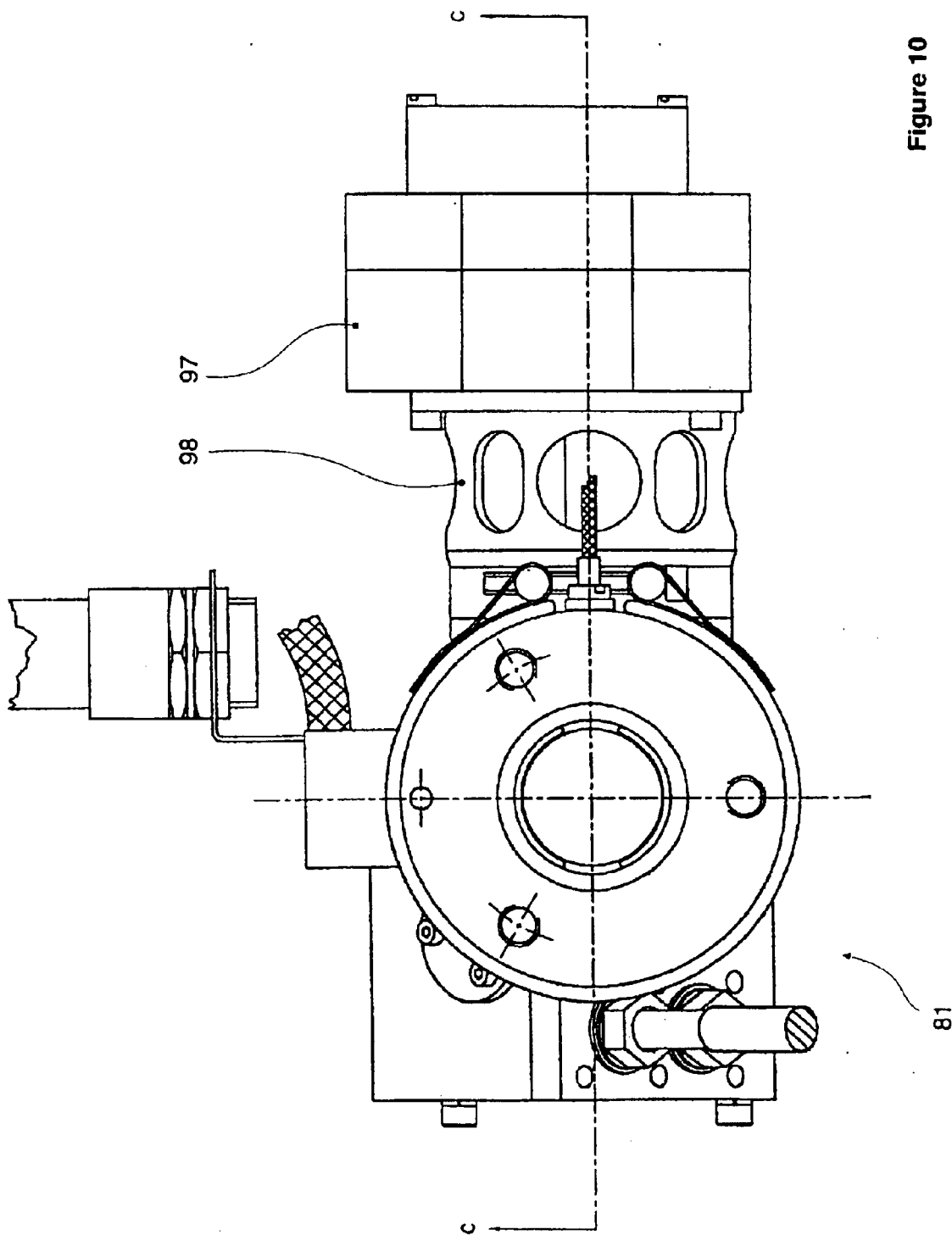
Figure 11:
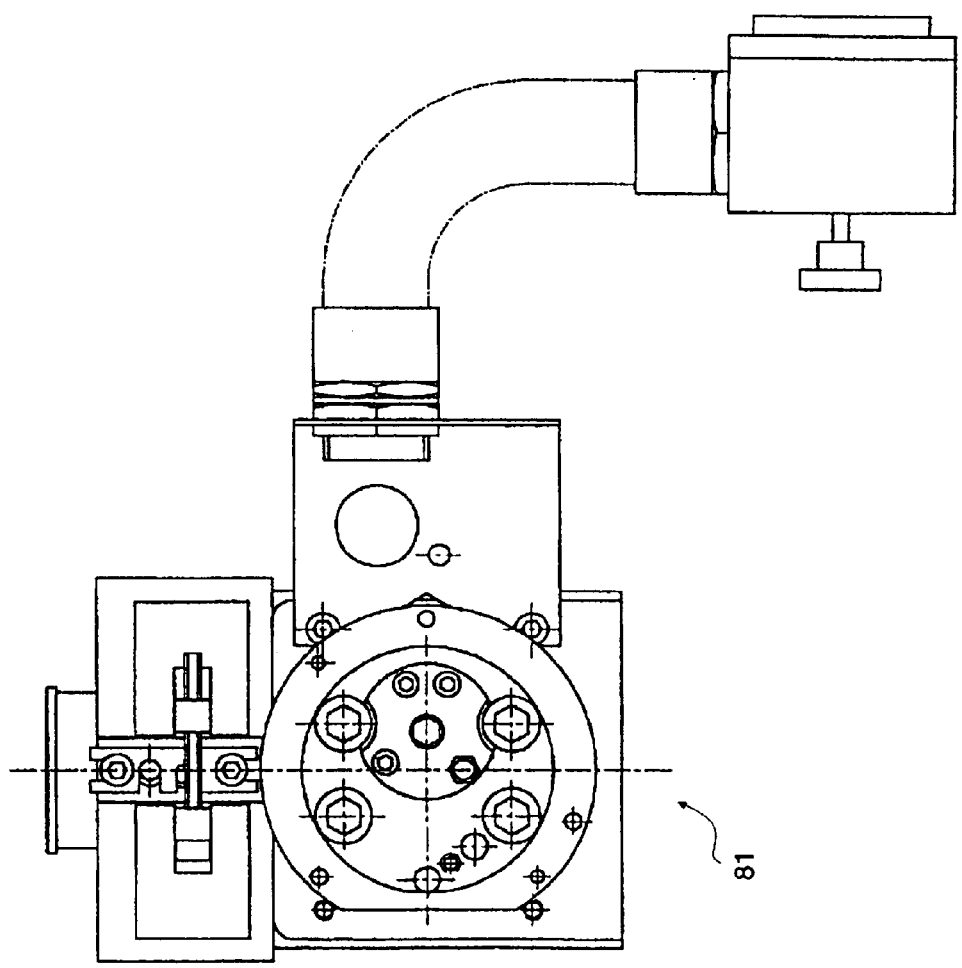
Figure 13:
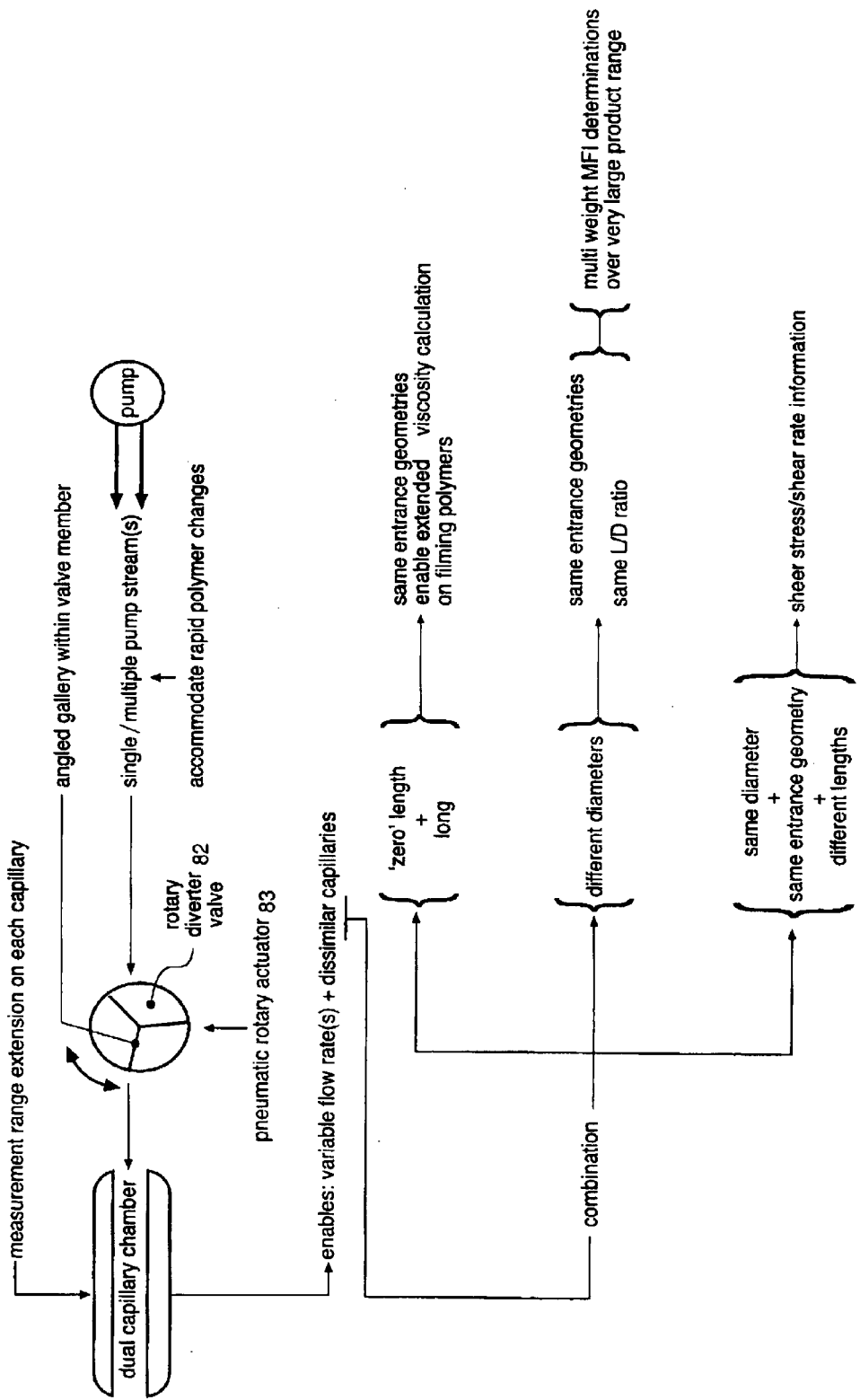
Figure 14:
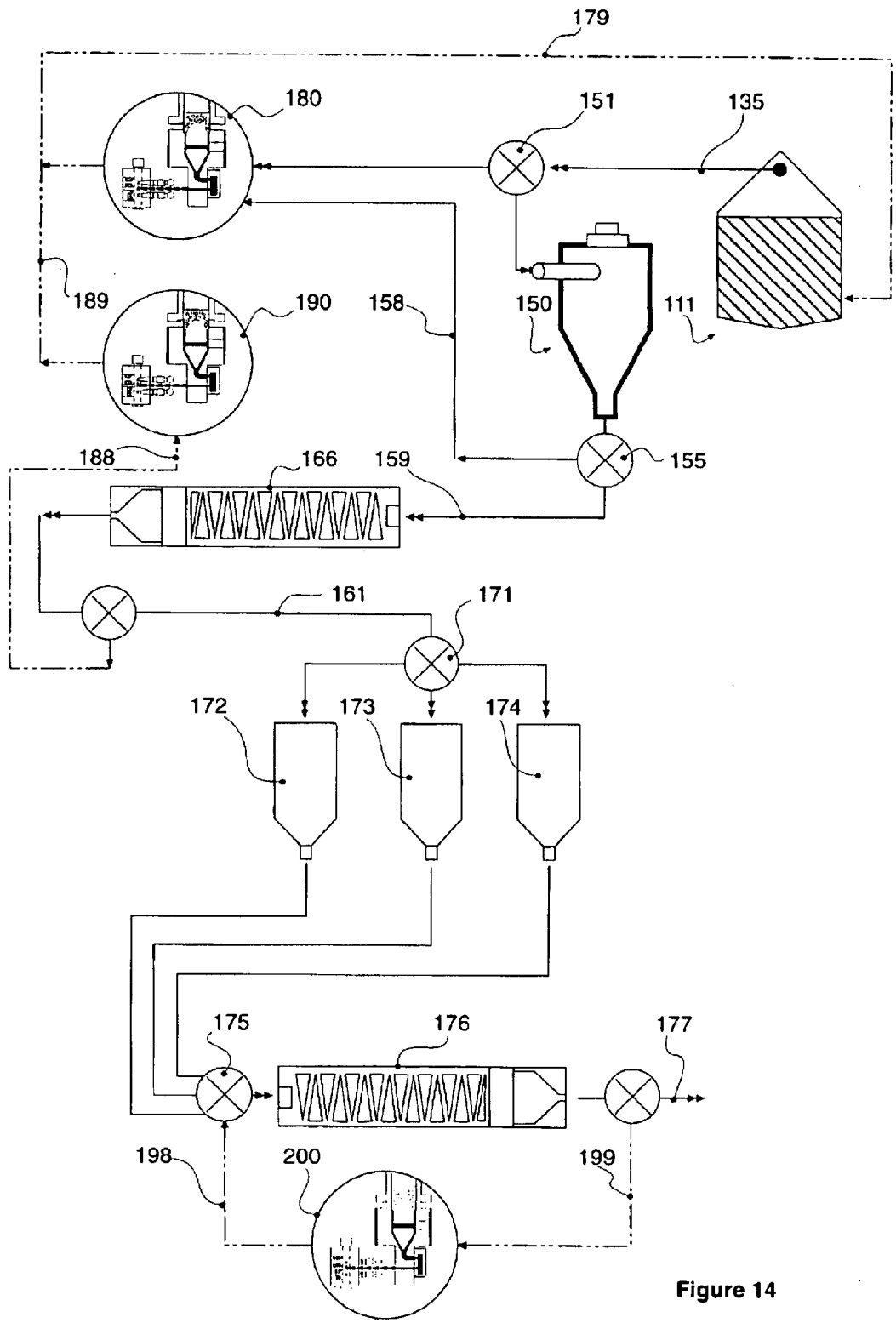

FIGS. $4C_1$ through $4C_3$ show successive operational stages of a linear reciprocating sampler valve for diverting polymer sample to either a viscometer, or waste discharge;

In relation to responsive viscometry sampling and determination:

FIGS. 5A through 5C shows a schematic, 2-D layout of principal viscometer features for MFI measurement in polymer reactor process control of FIGS. 1 and 2; and more specifically:

FIG. 5A shows closely inter-coupled viscometer ram, melter and gear pump stages;

FIG. 5B shows a dual measurement die block with capillary diverter valve selection and attendant differential pressure heads;

FIG. 5C shows enlarged measurement die detail 'C' of the die block in FIG. 5B;

FIG. 6 shows a more developed three-dimensional version of the dual die viscometer of FIGS. 5A through 5C;

FIG. 7 shows a part cut-away sectional view of the viscometer of FIGS. 5A through 5C and 6 taken along the line CC in FIG. 10;

FIG. 8 shows a section along the line BB of the viscometer shown in FIG. 7;

FIG. 9 shows a detail of the diverter valve construction, taken along the line AA of the viscometer shown in FIG. 8;

FIG. 10 shows a plan view of the viscometer shown in FIGS. 7 through 9;

FIG. 11 shows an elevation of the melter stage of the viscometer shown in FIGS. 7 through 10, with the gearbox omitted for clarity;

FIG. 12 shows, in chart form, an inter-related hierarchy of viscometer features for MFI measurement in the polymer reactor control of FIGS. 1 and 2;

FIG. 13 encapsulates MFI measurement range extension, through dual die capillary chambers and attendant differential pressure heads;

FIG. 14 shows a symbolic overview of three principal in-plant and external MFI measurement locations addressable by a viscometer of the invention.

Referring to FIGS. 1A and 1B, a polymer reactor 11, for catalytic polymerisation, regulates polymer chain length formation with a so-called Chain Transfer Agent (CTA), such as hydrogen gas. Polymer chain length in turn determines molecular weight and MFI of polymer product.

Broadly, the overall objective is closed-loop production control of polymer to a prescribed MFI characteristic. To this end, certain (reactor) operational data is required, as follows:

CTA flow
CTA concentration
reactor throughput
reactor temperature
MFI of reactor sample per standard test
MFI of reactor sample per viscometer The initiation of (polymerisation) reaction is determined by the introduction of catalyst, then counter-balanced by the input of CTA. With reaction under way and stabilised, periodic sampling of reactor output 32 is undertaken, for MFI testing, to establish the polymer (MFI) characteristics being produced.

Whilst the reactor internal environment is one of intense pressure, sample testing is undertaken in a less harsh regime. Thus reactor product samples for testing are first isolated from the reactor.

Figure 3:
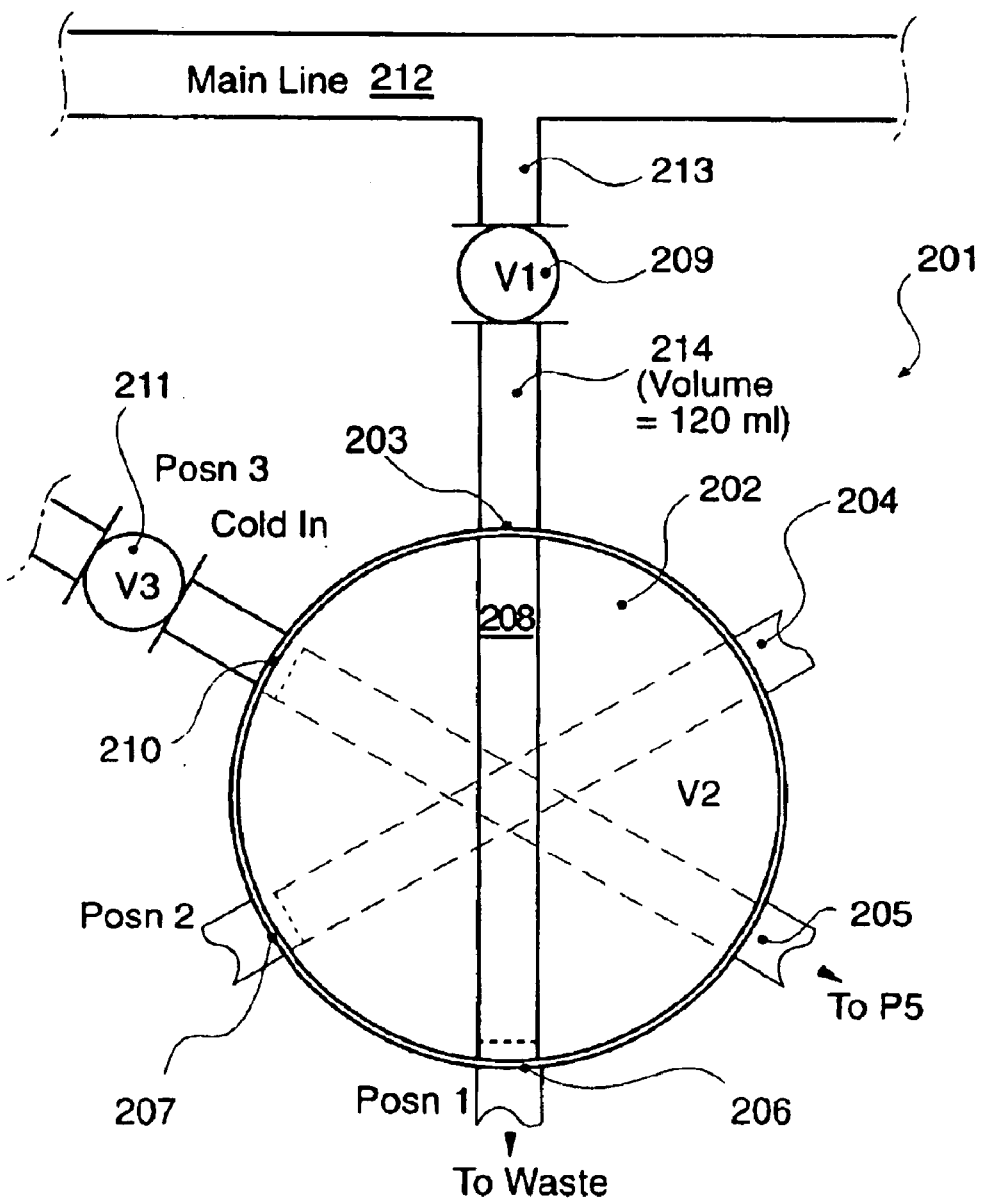
FIG. 3 shows a rotary sample isolator valve, for output from the polymer reactor of FIGS. 1A and 1B.

FIG. 3 shows a bespoke rotary sample isolator valve—for periodic isolation of samples of reactor output, as detailed later.

Reactor (polymer) output 32 is isolated in a sampler 50, detailed in FIG. 2, and passed through a cyclone separator 12, and an accumulator 14, to a responsive MFI test viscometer 15 configured according to an aspect of the invention—and whose MFI determination is used as a control factor, to regulate CTA supply to the reactor 11.

More specifically, CTA flow to the reactor 11 is controlled by a CTA flow adjustment valve 22, fitted between a CTA reservoir 21 and the reactor 11—and set by a CTA flow control signal 34

The concentration of CTA in the reactor 11 is monitored, through a tap line 36, with a sensing (gas) chromatograph 19, whose determination is applied as one input 37 to a CTA concentration controller 28.

Measurement output 38 from the viscometer 15 is applied to an MFI comparator 27, with a reference signal 39 from an MFI (target) set-point unit 31.

An output 41 from MFI comparator 27 is applied as another input to the CTA concentration controller 28, which issues a set command 42 to a CTA concentration set-point unit 29, in turn generating a flow set point control output 43.

The (target) flow set point 43 is applied to a CTA flow comparator 24, along with an input 44 of actual CTA flow. Actual CTA flow is derived from a CTA flow sensor 23, fitted downstream of the CTA flow adjustment valve 22, in the line between the CTA supply 21 and the reactor 11.

CTA flow control output 34 from the CTA flow comparator 24 is applied to the CTA flow adjustment valve 22.

FIG. 1B shows a variant of FIG. 1A following standard notation and symbolism for differentiating product flow from electrical measurement and control signals.

In this depiction of the overall operational scheme, a 'notional' MFI comparator and associated output 41 is integrated with the CTA concentration controller 28. Similarly, a 'notional' CTA concentration set point unit 29 and associated flow set point control output 43 are integrated in the CTA flow comparator 24.

FIG. 2 shows one approach to provision for isolating and pressure-conditioning a sampling environment, using a sample pot 50 with an array of diverter valves 51 through 57.

The sampler 50 is fitted to a branch pipe feed 59, downstream of reactor output line 32 and is selectively connected through a diverter valve 51. A vent valve 52 enables a flammable gas component, such as polypropylene, of polymer reactor product such as (poly)ethylene, to be vented from the sample. The sample is then (re-)pressurised, through a fill valve 53, to an inert nitrogen gas supply at 30 bar. Nitrogen (N2) serves as a non-flammable transfer medium or carrier agent.

By opening a sampler output valve 55 in a transfer line 58, such as high density polyethylene pipe, a (pressure) conditioned sample, can be 'flushed' to the viscometer 15 through the cyclone separator 12.

The sampler 50 can be set, by pressure regulator valves 56, 57, respectively to differential high (30 bar) and low (1 bar) pressure supplies, in sequential a flushing and re-charging sequence—for successive sample conditioning and isolation.

With a satisfactory sample test result, reactor output is allowed through an output valve 54 in the output line 32.

A test sample from the transfer line 58 is introduced into the upper section of the cyclone separator 12. Broadly, the separator 12 resembles a known cyclone for separating solids and only refinements for the present invention will be described.

The cyclone separator 12 segregates a solid powder or granular element of the reactor sample outwards—to be deposited upon sloping lower side walls. Powder or granular wall deposit 61 is dislodged periodically by a rotary scraper 62—falling to accumulate in a collection funnel mouth 63.

Sample material 61 is periodically dislodged to fall into a ram compaction chamber 71, for delivery to a melter of a viscometer 15.

A spiral agitator 64 at the funnel mouth 63, is mounted upon a common drive shaft 65 with the rotary scraper 62. The shaft 65 is rotated by a motor 66 fitted at the top of the separator 12. The spiral agitator 64 promotes accumulated sample inter-mixing, homogeneity and discharge.

An overflow diverter valve 69 at the funnel mouth 63 allows discharge of excess sample material—and may be used in conjunction with a more elaborate sample accumulator, for regulating and selectively disgorging for viscometric measurement, a prescribed sample size, as shown in FIGS. 4A through 4C.

A heater cuff 67 around the funnel mouth 63 pre-conditions the sample 61 temperature for testing.

As the sample 61 is still 'active', and subject to ongoing change, a de-activation agent, such as air, is introduced into the separator 12, before MFI measurement. In this example, air streams 68, directed from the foot of the separator 12, are used for de-activation. This helps ensures that the sample tested is representative of (recent) reactor output.

FIG. 3 shows a bespoke sample isolator valve configuration capable of addressing reactor output directly.

Essentially, a tapping 213 from a main polymer supply line 212 from a reactor is accessed, by a six port rotary valve 201, through a control valve 209 and static sample chamber 214 of prescribed volume.

The valve 201 incorporates a rotary valve member 202, with a diametral through passageway 208, defining a sample chamber to accommodate a prescribed polymer sample from the reactor output, ready for viscometric MFI determination upon pressurised displacement.

The valve member 202 is rotationally indexable, successively through a series of six cirumferentially-spaced stations 203 through 207 and 210, to communicate with associated radial valve ports, enabling various environment conditioning and transfer functions to be implemented, as described later.

Thus a port 204 is supplied with (inert) nitrogen gas $N_2$ transfer medium, at an elevated temperature, and under a pressure head of some 50 mm Hg.

Connection of the valve chamber 208 to the port 204 thus pressure conditions and imposes a displacement bias upon a polymer sample within the chamber 208.

When the valve 202 is indexed to align with one of a successive radial ports 203 through 207, at which a lower port pressure prevails for the time being, the pressurised sample is displaced—for example to a P5 viscometer for MFI measurement.

Aside from nitrogen conditioning, port 204 can also be used to introduce a de-activation agent, such as isopropanol, which inhibits ongoing reaction or oxidation of a sample in the valve chamber 208.

Thus the sample remains representative of reactor contents—and subsequent MFI measurement determination is meaningful for reactor control.

The port 205 (clockwise) in succession from port 204 is connected to a P5 viscometer for MFI measurement. The next port 206 is connected to a waste outlet. The following port 207 is connected to a vacuum, or relatively low pressure, source.

If the valve member 202 is indexed to port 207, (diametrically opposed to the pressure port 204), any pressure-conditioned sample, with entrained $N_2$, is allowed to 'flare' to a vacuum. This ensures 'clean' flushing-out or exhaustion of the valve chamber 208 after discharge to a viscometric determination.

The final port 208 in the sequence is connected to a cold or cooler conditioned nitrogen $N_2$ supply, through a control valve 211.

The entire valve body 202 is 'traced', by say immersion or through-passages, with temperature conditioning water at 80 degrees C.

An operational valve cycle is generally as follows:
the rotary valve member 202 is indexed, to align valve chamber 208 with port 207, (and thus opposed port 204) with valves 209 and 211 shut off.

Valve 209 is then opened, and a period '$x_1$' allowed to elapse, whereupon valve 209 is closed. This allows the static sample chamber 214 to fill, ready for loading the valve chamber 208 in a follow-on index position.

Valve member 202 is then indexed to align valve chamber 208 with port 205 (and opposed port 208), for a period '$x_2$', whereupon the valve member 202 is rotated to index the valve chamber 208 to port 206 (and opposed port 203), for a period '$x_3$', (thus loading the chamber 208 with the sample temporarily in the static chamber 214), after which the valve member 202 is indexed to port 207 (and opposed port 204).

Valve 211 is then opened, for a period '$X_4$', and closed.

In a variant of this rotary valve configuration, at port station 207, a nitrogen $N_2$ flare facility is replaced by a vacuum connection and heated nitrogen $N_2$ input is restricted, to hold a vacuum at 50 mmHg.

In practice, the valve member is preferably cylindrical, and about 140 mm O.D.

The valve chamber 208 is defined by a diametral cylindrical bore of some 31 mm diameter.

The valve member 202 can be trunnion-mounted upon roller bearings at its opposite ends.

Rotary seals (not shown) at each port are spring-loaded, and of very hard material; with the valve member 202 surfaced with even harder material.

FIG. 12 identifies significant viscometer features for on-line process control response.

Prefacing MFI measurement upon a sample, sample size variability can be contrived at a sample accumulator 14 (FIG. 1), 114, 124 (variant approaches being depicted respectively in FIGS. 4A and 4B), at the output of the cyclone separator 12.

Thus, for example, a variable measurement chamber can be achieved through concentric sliding interfit cylinders, as depicted in FIG. 4A. Alternatively, a movable piston and overflow weir can be employed, as depicted in FIG. 4B. In either case, the sampler 14 desirably enshrouded in a temperature-conditioning water jacket.

Generally, the objective is a high viscometer throughput capacity, with constructive use of measurement chamber purge between samples and sampling variability.

A multiple, in particular dual, capillary test chamber may be used for extended sampling range capability, as reflected in FIGS. 5A through 5C, 6, 8 and 9, with attendant performance considerations charted in FIG. 13.

These factors aside, testing must be repeatable, which necessitates steady test flow conditions. These in turn are contingent upon low back mixing, low frictional heating, flow path capillary profile—and reconciliation of 'entrance' effects at abrupt flow transitions to eliminate re-circulation and improve response times.

Pressure stabilisation, consistent with high throughput, and attendant high scour rates between samples, is addressed by high force, compaction ram delivery to the viscometer, a high capacity gear pump for melt throughput and careful or complementary melter configuration.

Refinement in gear pump stepper motor drive attends sample diversion through a rotary diverter valve into discrete dies at differential test pressures.

Internally, flow passageways must enjoy a certain uniformity to obviate localised aberrant flows—with careful matching of melter input pressure, size or capacity and configuration with pump character.

Selective deployment of measurement range extension through differential measurement dies is achieved with a rotary diverter valve 82, shown in FIGS. 5B and 6, operable by a pneumatic rotary actuator 83, incorporates capillary feeds 103, 104, 105 and 106. These allow the gear pump 77 output 80 to be selectively directed to one or more multiple (in this case dual) measurement dies 91, 93 of prescribed dimensions for given test ranges.

Thus variable test flow rates can be used for dissimilar dies and die combinations, as explored in FIGS. 12 and 13. Moreover, rapid polymer changes can be accommodated. Overall, multi-weight MFI determinations are possible over large product ranges.

FIG. 4A shows a sampler or sample accumulator 114, with movable displacement piston 112 and coupled overflow weir 111, to allow variable sample delivery to a viscometer pre-compaction ram feed tube 71. Thus, according to the piston 112 position, a charge chamber 115 has a certain sample capacity—in excess of which material is diverted into an overflow tube 117 through a ball valve 119. The viscometer delivery ram 73 acts as a valve controlling admission to the viscometer ram feed chamber 71 from the variable sample chamber 115.

FIG. 4B shows a rotary diverter valve sampler 124 variant of the sampler of FIG. 3A, with a rotary disc 125, with a through passage, selectively positioned by actuators (not shown) in a feed path 126 from the cyclone separator 12. The angular position of the rotary disc 125 controls admission of successive discrete sample increments 129, which can accumulate in a stack in an output tube 128, ready for single-shot viscometer delivery to the viscometer feed tube 71. Excess or redundant material is diverted through a discharge leg 127.

FIGS. $4C_1$ through $4C_3$ show successive operational cycles of an alternative linear viscometer sampling valve, for loading either a viscometer, or waste discharge.

Essentially, a shuttle valve 240 incorporates a reciprocating valve member 241 with an internal chamber 242 to receive a sample loading from a supply shute 243. The sample is loaded in the mid-position of the shuttle valve 241, and is discharged to either side, to communicate with output ports 244, 246 connected respectively to a viscometer, or waste discharge, upon linear reciprocating movement of the shuttle valve, under an actuator (not shown).

FIG. $4C_1$ shows the mid shuttle position; FIG. $4C_2$ the left shuttle position to a waste discharge; and FIG. $4C_3$ the right shuttle position to a viscometer.

A sample detector 247 ensures the sample chamber 242 is loaded, before enabling movement of the shuttle valve 241.

FIGS. 5A through 5C represent principal viscometer features. Thus, a powder or granular sample from the sample accumulators 14 (FIG. 1) 114, 124, (FIGS. 5, 6), is introduced into a feed chamber 71 of a compaction ram assembly 70.

The sample is consolidated by compaction ram 73 upon the specially-profiled head of a melter 74 mounted in a temperature-(stabilised) conditioned heater block 75. The high pressure and attendant temperature rise melts the sample, which can flow through and around the melter contours to an underlying delivery port stream 76.

The embedded melter 74 and heater block 75, are surrounded by a heater jacket 72—serving as a heat reservoir for stable temperature conditioning. A thermometer 78 penetrates the melter 74 and heater block 75, to monitor melt temperature.

The melter 74 has profiled through-passages 86, to promote material blending in transit. From the melter 74 a homogenous melted polymer stream 76 is fed to a gear pump 77. The gear pump 77 delivers a pressure-conditioned melt flow 80 to a measurement die block 81. A thermometer 79 penetrates the gear pump 77, to monitor delivery temperature of the melt stream output 80.

A rotary diverter valve 82 in the die block 81 allows selection of one of two measurement dies 91, 93 for MFI test flow. The discrete dies 91, 93 are subject to differential pressure heads Px and Py for test conditioning.

FIG. 6 depicts this inter-relationship of features and flows of FIGS. 7A through 7C, in symbolic 3-D format.

FIGS. 7 through 11 depict constructional detail of principal viscometer features.

Thus FIG. 7 shows a part-sectioned, part cut-away melter 74 and inter-coupled gear pump 77, feeding a conditioned sample melt stream 80 to measurement die block 81. The melter ram feed is omitted for clarity, but would be fitted at the melter head for powder or granule compaction.

Intimate direct mounting contact between a lower stem 89 of heater block 75 and die block 81 helps preserve melt sample (temperature) conditioning during testing.

Differential pressure head feeds Px and Py are applied to measurement die block 81, fitted with dual independent measurement dies 91, 93—for extended measurement capability without interruption for measurement head change.

A gear pump drive motor 96 and (reduction ratio) gear box 97, with an isolation cage mounting 98 from the gear pump 77, are shown in outline.

FIG. 8 shows a part-sectioned, part cut-away view of the die block 81, including dual measurement dies 91, 93, and attendant differential pressure feed couplings Px, Py. The die block 81 is orientated (eg at 45 degrees) to the vertical, for sample discharge upon emergence from the measurement die(s) 91, 93.

Differential pressure feed heads Px, Py are shown in direct line with respective measurement dies 91, 93. Separate sample streams emerge through respective capillary feeds 104, 105 from rotary diverter valve 82.

FIG. 9 shows a sectional view of the rotary diverter valve 82, with an axial stem 101, addressing capillary feeds 104, 105, in the dual measurement die block 81 of FIG. 8. The valve stem 101 incorporates dual angled capillaries 103, 106, for selective alignment between:

a common inlet port 108, fed by a sample melt stream 80 from the gear pump 77, and spaced opposed outlet ports of capillary feeds 104, 105 to respective measurement dies 91, 93.

The valve stem 101 is held captive in a bore 107 in the die block 81 by end plates 109, with a coupling head 110 at one end for connection to a valve drive motor 83 (not shown in FIG. 9).

FIG. 10 shows an outline plan overview of the melter, and laterally offset gear pump, gearbox and opposed measurement die block.

FIG. 11 shows an outline elevational equivalent of FIG. 10, from the gear pump, gear box side.

FIG. 14 shows a symbolic overview of principal aspects of the invention, namely:

polymensation control through viscometry; and viscometry refinement;

applicable both to original polymer production, and downstream (post-reactor) blending and re-processing through extruders.

The upper half of FIG. 14 depicts in-plant reactor control and reactor output blending activities. Thus, a polymer output stream 135 from a reactor 11 is diverted selectively by a valve 151 to a viscometer 180, either directly, or through a sample conditioner or accumulator 150.

Output from the sampler conditioner 150 is directed, by a diverter valve 155, either to a measurement stream 158, or an in-plant (post-reactor) extruder-blender 166.

Output 161 of the extruder blender 166 is selectively applied, by a diverter valve 171, to individual (homogenous) product stores 172, 173, 174, categorised according to known MFI characteristics.

The stores 172, 173, 174 represent overall plant output, with value supported—even bolstered—by knowledge of inherent MFI.

Viscometer 180 is dedicated to examining reactor output, either direct or through the sampler-conditioner 150. Companion viscometer 190 is dedicated to monitoring output of extruder blender 166 (post-extrusion), using a sampling stream 188.

Measurement dictated control data 179 from the viscometer 180 is applied as feedback, to contribute to control of the reactor 111. Similarly, measurement dictated control data 189 from the viscometer 189 is applied as feedback, also to contribute to control of the reactor 111.

With known MFI ingredients, blending at an onward or re-processing plant for producing specific products is reflected in the lower half of FIG. 14.

Prescribed admixtures of known ingredients 172, 173, 174 are applied through an 'active' mixer valve 175 to feed an extruder-blender 176. Blending control is achieved by active on-line monitoring of the (MFI) characteristics of the post-extrusion blend, through a dedicated viscometer 200.

A post-extrusion sampling link 199 from the extruder-blender 176 communicates with the input of viscometer 200.

Feedback control is applied from the viscometer 200 to the extruder-blender 176 along a signal path 198.

An extruder output stream 177 may be applied to, say, injection moulders, to produce specific products with optimised blended ingredient.

Sample De-Activation

Integrating such viscometer refinement with reactor sampling enables representative, real-time, on-line reactor sampling. However, before MFI determination, a reactor polymer output sample must be stabilised, by de-activation. Thus a post-reactor, de-activation stage is provided, for polymers drawn directly from the reactor in powder form, to prepare a sample prior to measurement.

Such deactivation takes place in a chamber which is stirred by an open spiral. The spiral sits in the bottom of a cyclone and is driven from the top of the cyclone through a variable speed motor. Powder is released from the sides of the cyclone face by a scraper, which articulates to fit the cone surface, gaining its forces by downward pressure from its own weight.

Air streams are also used to dislodge materials, by direction upwards from the base of the cone. The cyclone is also fed from an air stream which is delivered to the nose seal of the piston. The air stream is used for the purposes of de-activation of the polymer. Air carries moisture and the water breaks down the catalyst into its non-active parts.

Heat to speed the de-activation process is supplied from a cuff heater around the parallel section which also contains the spiral.

The above moist air and stirred, heated-chamber catalyst de-activator conditions are applicable, but not restricted, to a wide number of polymer catalysts of the so-called Zeigler-Natta generic type.

Sampling Isolation & Transfer

In taking a reactor sample for MFI measurement, there is a need to 'blow-off', or vent, a flammable part—in this instance propylene—and replace it with a non-flammable part. Moreover, with repeated sampling, successive samples must be isolated. To this end, a series of isolating valves downstream of the reactor enables isolation of a defined, isolated, sample volume—typically very small (through limited inter-valve line capacity), for onward transfer to a cyclone separator. A sample sequencing routine is employed of successive fill, venting, re-fill, venting, etc.

Similarly, in transferring a sample to a measurement viscometer, a neutral flushing agent, such as nitrogen gas, may be employed.

Cyclone Separation

A cyclone separator, as a form of ultra-centrifuge, essentially uses multiple inter-nested vortices and 'coning' angles in a gently tapering enclosure to separate (powdered or granulated) solids to the enclosure walls from gas flow—which is vented, keeping down air velocity in the delivery to a viscometer feed ram.

Upon the introduction of de-activation agent into the cyclone separator, heat will speed up de-activation—to typically some 2.5 minutes.

In practice, air (or some other polar de-activation agent) is blown up past a sample ram displacement piston loading the Applicants' (model P5) viscometer upwards into a cyclone separator.

Separated product driven outwards slides/slips progressively down the sloping cyclone walls, dislodged by a rotary scraper blade, and drops into a heated discharge chamber into which is inserted a rotary screw feed auger.

Catalyst remains entrained with the product and cannot be removed in the separator.

For applications where the product is to be measured is of de-activated pelletised or granular form (post extruder), there is no need for the de-activation equipment at the P5.

Sampling for MFI Measurement Viscometry

The (repeat measurement) sampler is either an overflow weir above the ram chamber, as a variable sample chamber, or a discrete volume shuttle valve, which meters known volumes of material into a hold up chamber (large enough to contain the maximum charge).

The remainder of the delivered charge is discharged to a collection point by a second route. Actuation of the shuttle is by a 3-position pneumatic cylinder controlled by the P5, such as depicted in FIGS. $4C_1$ through $4C_3$.

The sample chamber connects to an inclined viscometer feed tube, which is closed of temporarily by a sliding compaction and feed ram.

Viscometery Sample De-Activation

This ram sample delivery to the viscometer plays a vital role in squeezing de-activating air speedily from the sample upon introduction to the viscometer.

If de-activation is not completely effective, residual monomer—ie that which cannot be separated out in the cyclone separator or pressed out the in the viscometer loading feed ram—can link with polymer reactor product and continue to grow in the de-activation chamber.

This introduces an uncontrolled, random change in polymer structure and attendant molecular weight, with the consequence that what is being measured does not reflect the reactor product, so reaction control through MFI is undermined.

Similarly, if de-activation leaves a residue, the polymer measurement sample is degraded.

In considering measurement efficacy for live process control, it should be recognised that, overall, two 'competing' processes are at work, at a critical pre-measurement stage, namely:

catalyst growth; and material splitting with de-activator residue.

This 'pro-degradant' counter-effect is promoted by oxygen introduced with de-activation air.

In order to suppress such sample degradation, the Applicants also envisage 'trickling' isopropanol vapour—from, say, a 'boiler' generator—into the air purge.

Such isopropanol would serve both as an anti-oxidant 'kill' and prevent sample contamination by the presence of oxidisation. The isopropanol would be flared-off before viscometer measurement.

In turn this admits identical calibration of the Applicants' model P5 viscometer MFI measurement with the equivalent laboratory standard measurement.

Reverting to MFI measurement sampling, product accumulates as a sample of prescribed size, temperature-stabilised by an external heater around the chamber, ready to load the viscometer.

Excess product over the prescribed sample sizes is allowed to overflow through an overflow diverter valve and is dumped, with minimal wastage consistent with process constraints.

An infra-red or capacitance sensor monitors the accumulation of product at the base of the separator.

In principle, any agent with polar characteristics, such as water (of which there is sufficient in air) can be effective in de-activating small residual quantities of catalyst entrained with the reactor polymer product—and typically representing a tiny proportion in parts per million.

Generally, polymersation produces a large spread of particle size—not split or segregated in the separator, to preserve overall reactor sampling consistency.

The sampling and test time cycle allows a sample to be called just before needed, allowing time (a matter of seconds) to flare flammable gas before cyclone separation. This test cycle time is short (some 30 seconds or less) compared to the viscometer cycle time (some 5 minutes)—and less than reactor times of ½ to 2 hours.

Effective and consistent (ie repeatable) MFI measurement requires a (in conventional measurement techniques, self-contradictory) combination of precision and haste. In that regard, a critical factor is the time for de-activation—since otherwise all the time the sample itself is changing by ongoing reaction, rendering subsequent measurement unrepresentative and so superfluous.

CTA Concentration Measurement

In practice, for chain transfer agent concentration measurement, a sample is drawn from the reactor gas above the polymer bed. Care is taken to obtain a representative sample, by avoiding sampling within 0.5 m of the powder bed or vessel walls. The intake is provided with a filter, to prevent entrainment of polymer powder.

The sample pressure is reduced by a pressure regulator to a convenient level and the sample is piped to the process gas chromatograph. The pressure reducing unit and line are maintained at a temperature which will prevent condensation of any component in the sample. Flow in this line is maintained to provide a transit time from the sample intake to the instrument of one minute or less. Any unused sample portion is piped to the reactor flare system. All lines between the sample line and the chromatograph sampling valve have as low a volume as possible. The cycle time of the measurement is reduced to the practical minimum.

CTA Flow Measurement

For chain transfer agent flow measurement, the set point for chain transfer agent flow control is derived by comparing actual flow from a meter with a flow set point, using a conventional PID controller, or a process model controller, depending on the reactor characteristics. The flow set point itself is derived from a chain transfer agent concentration controller.

Operational Example

In one embodiment, a reactor output sampler-conditioner is fitted downstream of a (diverter) valve, which diverts a portion of the material discharged in normal operation into a chamber of fixed volume. The diverter valve is operated while the normal discharge is taking place. The sample is then discharged into a second chamber, where it can be purged of volatiles by repeated pressurisation with nitrogen, followed by venting into the flare system. After the chamber is vented to flare, it is (re-) pressurised with nitrogen to reactor pressure and vented to flare again.

Where liquids of low volatility are present, the chamber may be heated to speed up this process.

This sequence can be repeated until monomer levels are below 0.2% typically. The sample is then transferred to a viscometer with refinements according to another aspect of the invention (such as an enhanced version of the Applicants' model P5 viscometer), by forcing it through a transfer line, using nitrogen—at a pressure limited by the line burst pressure. A typical transfer line is 20 or 25 mm ID high density polyethylene (HDPE) pipe, with 15 Bar working pressure. This has worked over a 180 m distance and is easily run along existing cable trays or other supports.

Where flammable gas is not present, air can be used to transfer the sample. This is cheaper to run and substantially improves catalyst deactivation efficiency where oxygen is an effective deactivating agent.

The operation of the sampler is monitored by pressure switches in the sample vessel and limit switches to indicate the position of each valve.

The sequence can be controlled by a plant computer, an independent PLC (programmable logic controller), or by software incorporated in the Applicants' (model P5) viscometer.

In the latter case, the cabling from the Applicants' (model P5) viscometer to the sampler follows the same route as the sample transfer line.

The valves used in the sampler construction are chosen to have a long life in a 'dirty' high pressure environment. Plug valves using ceramic plugs and stainless steel seats, or trunnion mounted ball valves with hardened balls and hardened, spring loaded seats are examples of those used with success.

In a particular configuration, the fixed volume chamber is provided by a plug valve with four ports at 90 degree orientation. The valve is inserted in the discharge line and remains 'open' in normal running, but when a sample is required, is driven 'closed' during discharge. A sample is trapped in the valve bore and discharged into a separate chamber via the other ports.

Monomer is purged out in the second chamber and the sample is then transferred to the MFI measurement rheometer, such as the Applicants' (model P5) viscometer. The sample arriving at the Applicants' (model P5) viscometer is separated by a cyclone and the transfer gas discharged outside the viscometer enclosure. Incorporated in the cyclone is a motion detector, to verify the sample arrival.

Where the reactor uses two discharge units, samplers are desirably attached to both units and their respective transfer lines connected to the cyclone.

At the base of the cyclone is an inlet plug, which can be opened to allow a calibration sample to be introduced. A capacitative detector may also be installed, to verify that the extra sample is present.

Below this is a chamber, typically some 35 mm in diameter, and of a length chosen to hold the correct volume, is situated a plug valve, which can be opened to allow excess sample to flow to waste.

The chamber is of copper plated with nickel and heated by external bands to maintain a temperature of 50 to 110 degrees C., sensed by a thermocouple. The chamber is attached to the ram tube of the Applicants' (model P5) viscometer and is closed off by the viscometer ram, unless the ram is fully retracted.

Polymer in the heated chamber may be agitated, in order to correct any segregation of sample particles by size, which may occur during transfer and to improve the rate of deactivation of catalyst residues.

Agitation is by a close-fitting spiral agitator, of 40 mm pitch and 5 mm width, through the heated chamber. The agitator is rotated, by a variable speed motor mounted on the top of the cyclone, to provide upward movement of the polymer near the chamber wall. The agitator is restrained at the base of the heated chamber and just below the overflow valve by plain bearings. Above this point a central shaft joins the spiral to the drive motor.

Where fine material tends to 'hang up' or collect in the cyclone, a scraper can be mounted on this shaft to dislodge it.

Deactivation of catalyst can be achieved by a variety of chemical agents, including oxygen, water, carbon dioxide, ammonia and low MW alcohols. The choice depends upon contact time, polymer particle size and chemical structure of catalyst and activator employed.

The agent is vaporised (if necessary) into a stream of air or nitrogen, which is injected at 0.6 to 2.0 l/min at the top of the ram tube of the Applicants' (model P5) viscometer and passes down the tube and into the heated chamber. In some cases a similar injection of deactivating agent at 5 to 15 l/min is made into the cyclone.

Product Run

In a particular product run, a 'second generation' Zeigler-Natta catalyst was reproducibly deactivated, by exposure to 12% oxygen in nitrogen, at a chamber temperature of 110 degrees C., within 3 minutes.

As the Applicants' (model P5) viscometer measurement cycle was six minutes, and sampling delay was 1.5 minutes, the exposure time proved adequate.

Even with access to accurate and timely data on MFI, chain transfer agent concentration and/or flow and polymerisation rate, control of MFI by alteration of chain transfer agent flow requires a suitable model of the reaction system.

The measurement of MFI by the Applicants' model P5 viscometer is set up to emulate the standard manual grader conditions for the polymer involved.

In the event that the time required for this is much shorter than the sampling delay, it is desirable to increase the sample size and make the two measurements on one sample. This will reduce errors caused by sampling and segregation of the sample.

Where two samplers are used on one reactor, they should be used alternately for the same reason.

In order to eliminate the effect of offsets in MFI caused by deactivation phase measurement, the entire system should be calibrated over the operating MFI range against standard grader values. This can be done by collecting a 'double' sample with the second one collected from the overflow valve being measured in the usual way. The calibration data is incorporated in the Applicants' (model P5) viscometer software, so that a 'true' MFI is displayed and transmitted to other equipment.

MFI data can be transmitted to the 'main' plant computer, as an analogue signal or via a serial digital link. Desirably, the operation of the system is monitored routinely, by comparing manual data with Applicants' (model P5) viscometer data at suitable intervals.

The data necessary for 'tuning' the control loops can be collected at the same time as MFI calibration data. The data required is MFI ('manual' and Applicants' model P5viscometer), chain transfer agent flow and concentration, reactor throughput and reactor temperature.

In most examples the first order time constants and dead times for both control loops are significantly influenced by throughput and temperature. When this influence is incorporated into the control model, a substantial improvement in control can be achieved.

Viscometry Modes

Revised and extended viscometry modes may be adopted. More specifically, repeated alternate charging and purging cycles of a sample chamber are used for an extended measurement range.

Thus, test measurements are taken at a range of pressure differentials, which span or embrace a pressure equivalent to that prescribed under the standard laboratory test.

This test cycle regime effectively represents a dual shear rate measurement cycle, from which straight line interpolation can yield an MFI reading.

In a further refinement, a variable purge rate is employed, to compensate for variable flow rate used (earlier) in the test cycle to match material characteristics.

Consequently, taken overall, the amount of material consumed in each measurement cycle remains substantially constant.

Component List 11 reactor
12 cyclone separator
13 vent
14 sampler/sample accumulator
15 rheometer (viscometer)
19 sensing gas chromatograph
21 CTA supply
22 CTA flow adjustment valve
23 CTA flow meter/sensor
24 CTA flow comparator
27 MFI comparator
28 CTA concentration controller
29 CTA concentration set point unit
31 MFI set point
32 reactor output
34 CTA flow control signal
36 CTA sensing output
37 input
38 viscometer output
39 reference signal
41 MFI comparator output
42 CTA set command
43 flow set point output
44 actual CTA flow input
50 sampler, sample accumulator
51 diverter valve
52 vent valve
53 fill valve
54 output valve
55 sampler output valve
56 (high) pressure regulator valve
57 (low) pressure regulator valve
58 transfer line
59 branch feed line
61 powder/granular deposit
62 rotary scraper
63 collection funnel mouth
64 spiral agitator
65 drive shaft
66 drive motor
67 heater cuff
68 de-activation air stream
69 overflow valve
70 compaction ram assembly
71 ram compaction viscometer feed chamber
72 heater jacket
73 viscometer delivery ram
74 melter
75 heater block
76 polymer melt stream
77 gear pump
78 thermometer
79 thermometer
80 melt stream
81 measurement die block
82 rotary diverter valve
83 rotary pneumatic actuator
86 through passage
Px pressure feed couplings
py pressure feed couplings
89 heater block stem
91 measurement die
93 measurement die
96 gear pump drive motor
97 gearbox
98 isolator cage mounting
101 diverter valve stem
103 angled capillary
104 capillary feed
105 capillary feed
106 angled capillary
107 bore
108 common inlet port
109 end plate
110 coupling head
111 reactor
112 displacement piston
114 sampler/sample accumulator
115 charge chamber
116 overflow weir
117 overflow tube
119 ball valve
125 rotary disc
126 feed path
127 discharge leg
128 output tube
129 samples
135 (polymer) output stream
150 sampler-conditioner (accumulator)
151 diverter valve
155 diverter valve
158 measurement stream
159 extruder input feed
161 extruder output stream
166 extruder-blender (in-plant)
171 diverter valve
172 product store
173 product store
174 product store
175 active mixer valve
176 extruder-blender
177 extruder output stream
179 control data
180 viscometer
188 sampling stream
189 control data
190 viscometer
197 sampling link
198 control signal path
200 viscometer
201 (six port) rotary sample isolator valve 202 rotary valve member
203 valve port station
204 valve port station
205 valve port station
206 valve port station
207 valve port station
208 valve chamber
209 valve
211 valve
212 main feed line
213 tapping
214 charge volume
240 reciprocating linear shuttle valve
241 shuttle valve member
242 sample chamber
247 sample detector

What is claimed is:

1. A method of closed-loop regulation of polymerization in a reactor using a chain transfer agent (CTA) to determine average polymer chain length, the method comprising the following steps:

(a) periodically selecting, isolating, and conditioning of discrete samples of polymer output from said reactor;

(b) measuring samples of viscometric melt flow index (MFI) values directly and on-line;

(c) comparing a directly measured sample MFI value and a desired target reactor polymer output MFI value; and (d) periodically adjusting supply of said CTA to said reactor responsive to ongoing comparing carried out at step (c).

2. The method of claim 1, wherein successive samples of reactor polymer output are individually isolated, conditioned, and stabilized in a sampler passed through a cyclone separator into an accumulator, and then to an a MFI test viscometer, configured for repeated, isolated sample MFI determination.

3. The method of claim 1, further including:
   a step of sample deactivation, carried out prior to step (b).

4. A polymerization reactor control apparatus, including:
   a supply of chain transfer agent (CTA) coupled to a CTA flow meter and a CTA flow regulator intermediate said supply and a reactor;
   a CTA flow comparator, coupled to a CTA concentration set point unit and to a CTA concentration controller;
   wherein discrete samples of polymer output from said reactor are periodically selected, isolated, and conditioned;
   an MFI comparator coupled to an MFI set point unit, and to a viscometer to measure samples of viscometric melt flow index (MFI) values directly and on-line;
   wherein a supply of said CTA provided to said reactor is periodically adjusted and CTA concentration of said reactor is closed-loop controlled by said CTA flow regulator as a function of sample MFI determination by said viscometer.

5. The polymerization reactor control apparatus of claim 4, wherein said CTA flow regulator comprises a valve controlled by a flow control signal derived from said CTA flow comparators from a CTA flow set-point control output, based upon a viscometer MFi determination and actual CTA flow input, derived from said CTA flow meter.

6. The polymerization reactor control apparatus of claim 5, wherein a measurement output from said viscometer is coupled to an MFI comparator for comparison with a reference target signal from said MFI set-point unit to produce an MFI correction factor for use by said CTA concentration controller, which issues a set command use by a CTA flow cooperator-controller, to generate flow control output.

7. The reactor control apparatus of claim 6, further including a sensing gas chromatography coupled via a tap line to monitor CTA concentration in said reactor, and to provide a chromatography output signal coupled as an input to said CTA concentration controller.

8. The polymerization reactor control apparatus of claim 4, wherein successive reactor output samples are individually isolated, stabilized, and pressure-conditioned upon transfer from said reactor to said cyclone separator via a sampler.

9. The polymerization reactor control apparatus of claim 4, wherein nitrogen gas ($N_2$) is employed as a sample transfer medium between said reactor and said sample MFI determination viscometer.

10. The polymerization reactor control apparatus;
    a funnel having an input coupled to an output of said cyclone separator;
    a ram compaction chamber coupled to an output of said funnel;
    a compaction ram, movable within said ram compaction chamber;
    a melted, coupled to said ram compaction chamber;
    a gear pump coupled to an output of said melted; and
    a measurement die block, coupled to an output of said gear pump;
    wherein determination of melt flow index (MFI) is carried out on sample material from said cyclone separator following collection, mixing, and temperature pre-conditioning in said funnel, said sample material being discharged into said compaction chamber, and consolidated by said compaction ram upon said melted, whereupon said gear pump delivers a conditioned sample melt stream to said die block for MFI test flow measurement.

11. The polymerization reactor control apparatus of claim 4, further including an isolation chamber useable as temporary storage of a sample of polymer output, from said reactor, said isolation chamber including:
    a multiple port rotary valve with a rotary valve member defining a diametral passage, said mutliple port rotatry valve serving as a sample conditioning and transfer chamber that is selectively alignable with circumferential ports, and connected to transfer, condition, discharge, and flush media;
    wherein upon receiving polymer sample from said isolation chamber, said chamber is connected successively with respective ports, to effect sample conditioning, deactivation and addition of transfer medium, preceding discharge for viscometric determination;
    wherein further port connection effects vacuum flushing, to purge remaining polymer, and effects valve cooling, following sample discharge.

12. A viscometer for MFI determination in a reactor polymerization control method that includes use of a chain transfer agent (CTA) to determine average polymer chain length by (a) periodically selecting, isolating, and conditioning discrete samples of polymer output from a reactor; (b) measuring samples of viscometric melt flow index (MFI) values directly and on-line; (c) comparing a directly measured sample MFI value and a desired target reactor polymer output MFI value; and (d) periodically adjusting supply of said CTA to said reactor responsive to ongoing comparing carried out at step (c); the viscometer including:

a die block;

a rotary diverter valve disposed within said die block;

at least first and second angled capillaries defied in said die block;

at least first and second measurement dies, selectively coupleable to a chosen one of said first and second angled capillaries so as to selectictively divert samples of polymer output by said reactor, subject to differential respective pressure heads (Px, Py);

wherein conditioning of MFI viscometric testing can occur without interruption to measure any change in said pressure heads (Px, Py).

13. The viscometer of claim 12, further including:

a linear reciprocating shuttle value to selectively divert a sample of said polymer to one of a viscometer and a waste discharge.

14. A polymer reactor process control method, comprising the steps of:

applying a chain transfer agent (CTA) to a reactor to control a polymerization reaction within said reactor;

measuring melt flow index (MFI) of a pre-conditioned sample of polymer output from said reactor;

determining a CTA concentration correction according to a preceding sample MFI determination;

applying said CTA concentration correction;

measuring effect of applying said CTA concentration correction upon sampled MFI obtained at said output from said reactor; and continuing successive output sampling MFI measurement and attendant CTA flow adjustment to stabilize output of said reactor to a desired MFI target criteria.

15. A polymerization process control method for use with a reactor, the method including the following steps:

controlling melt flow index (MFI) on a polymer output from said reactor, selecting, conditioning, and measuring successive sample from said reactor, said samples having been isolated from said reactor;

carrying out at least one of purging and neutralizing a chain transfer action (CTA) associated with said reactor to accomplish at least one of suppressing ongoing reactivity, promoting stability of said samples, and enhancing representation of polymer output from said reactor; and subsequent to a flushing of said samples, determining MFI using at least one of a neutralizing agent, and an anti-oxidizing agent;

wherein said determining MFI is carried out with a repetition selected from periodically and continuously such that adjustment to flow of said CTA is maintained and adjustment to conditions in said reactor and output of said polymer are controlled such that output characteristics of said polymer are substantially pre-determined.

16. A method to control melt flow index (MFP) in a polymer output from a reactor selected from a reactor group consisting of continuous, catalyzed, and slurry-phase, the method including the following steps:

using and measuring a concentration of a chain transfer agent (CTA) by conducting gas chromatography on process environment within said reactor;

measuring actual CTA flow to said reactor;

determining MFI for a selected discrete sample of polymer output from said reactor;

comparing sampled determined said MFI with a desired target MFI set point;

generating from a result of said comparing a target CTA concentration set point;

comparing actual CTA concentration, with said CTA concentration set point; and adjusting, CTA concentration in response to actual CTA concentration, actual CTA flow, and CTA concentration set point, by adjusting CTA flow to said reactor.

17. The method of polymer process control of claim 14, further including:

taking samples to a set target size in a range from 80 gms to 120 gms, to a tolerance not exceeding 5%; and freeing samples so taken substantially of monomer and active catalyst to inhibit changes in MFI during subsequent sample MFI determination, to reduce hazard from at least one of fire and toxicity, and to maintain, total time for sampling, transfer, and de-activation to less than a cycle time of a viscometer used during sample MFI determination.

18. The process control method of claim 4, further including suppressing sample degradation before step (b) by trickling isopropanol vapor from a boiler generator into an air purge;

wherein presence of oxidation serves as an anti-oxidant and to prevent sample contamination.

19. The method of claim 1, further including:

a step of sample deactivation, carried out prior to step (b), wherein a catalyst inhibiting agent is introduced.

20. The method of claim 19, wherein said inhibiting agent includes isopropanol.

21. A method of closed loop control of melt flow index (MFI) in a continuous catalyzed polymerization process in a reactor, the method comprising the following steps:

(a) measurement of a chain transfer agent (CTA) flow to said reactor, and adjustment of said flow directly upstream from a location of said measurement;

(b) taking discrete samples of polymer output from said reactor, and on-line viscometric sample measurement of said MFI;

(c) comparing sample measurement of said MFI with an MFI set-point;

(d) using a CTA concentration controller to generate a concentration set-point using output from a comparison of said MFI; and (e) adjusting concentration of said CTA responsive to CTA concentration, to said flow, and to determinants of said set-point.

22. The method of claim 21, wherein step (a) includes at least one of using a flow meter to measure said CTA flow, and adjusting said flow using a control valve.

23. The method of claim 21, wherein at step (b) said samples are representative of contents of said reactor; and step (b) includes at least one of:

a sample delay less than 1.5 minutes between request for one of said samples and actual sampling;

sample size has a set-pont in a range of 80 gms to 230 gms, and variation from said set-point does not exceed 5%;

said samples are free of monomer and of active catalyist such that fire hazard and toxic hazard are reduced;

no change in MFI occurs while measurement of said MFI is taken; and total time for sampling, transfer, and deactiviation is less than a cycle time for a rheometer associated with said reactor.

24. The method of claim 21, further including a step of suppressing sample degradation that is carried out prior to step (b).

25. The method of claim 21, further including a step of suppressing sample degradation that is carried out prior to step (b), said step of suppressing sample degradation including:

trickling isopropanol vapor from a boiler generator into an air purge to create an anti-oxidant environment that suppressed contamination of said sample due to oxidation.

26. The method of claim 21, further including at least one step selected from a group consisting of (i) taking MFI readings with a repeatability of 0.5%; (ii) taking MFI readings with agreement to a standard manual test to within 1%; (iii) using a response of at least 90% to a step change in MFI within a single measurement cycle; (iv) providing a measurement cycle time not exceeding 6 minutes; and (v) providing a measurement cycle time constant within 10% over an MFI reading ranging from 1 to 50.

* * * * *